United States Patent
Sugihara et al.

(10) Patent No.: US 6,793,276 B2
(45) Date of Patent: Sep. 21, 2004

(54) AUTOMOBILE FLOOR STRUCTURE

(75) Inventors: Tsuyoshi Sugihara, Hiroshima (JP); Takanobu Kamura, Hiroshima (JP); Minoru Sunada, Hiroshima (JP); Yoshio Fujii, Hiroshima (JP); Shoji Nanba, Hiroshima (JP); Toshiharu Ikeda, Hiroshima (JP); Gunji Yoshii, Hiroshima (JP); Tsutomu Naganuma, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/206,815

(22) Filed: Jul. 29, 2002

(65) Prior Publication Data

US 2003/0034673 A1 Feb. 20, 2003

(30) Foreign Application Priority Data

| Jul. 30, 2001 | (JP) | ................................ | 2001-229093 |
| Apr. 15, 2002 | (JP) | ................................ | 2002-111651 |
| Jul. 16, 2002 | (JP) | ................................ | 2002-207353 |
| Jul. 18, 2002 | (JP) | ................................ | 2002-209262 |

(51) Int. Cl.[7] .............................. B62D 25/20; F16F 7/00; F16F 15/00
(52) U.S. Cl. .................. 296/204; 296/1.03; 296/193.07
(58) Field of Search ................................ 276/204, 1.03, 276/184.1, 191, 193.07, 203.01; 181/207; 267/90, 136

(56) References Cited

U.S. PATENT DOCUMENTS

| 1,736,548 A | * | 11/1929 | Pye ....................... 296/193.07 |
| 2,090,459 A | * | 8/1937 | Paton ......................... 296/191 |
| 4,402,545 A | | 9/1983 | Utsunomiya et al. |
| 4,572,571 A | | 2/1986 | Malen |
| 5,127,704 A | * | 7/1992 | Komatsu ..................... 296/204 |
| 5,129,700 A | * | 7/1992 | Trevisan et al. ....... 296/193.07 |
| 6,186,578 B1 | | 2/2001 | Garnier et al. |

FOREIGN PATENT DOCUMENTS

| JP | 404303076 A | * | 10/1992 | .................. 296/204 |
| JP | 405221342 A | * | 8/1993 | .................. 296/204 |
| JP | 406099857 A | * | 4/1994 | .................. 296/204 |
| JP | 406144299 A | * | 5/1994 | ............. 296/203.01 |
| JP | 09-202269 A | | 8/1997 | |

OTHER PUBLICATIONS

JP 09202269 A rough translation from JPO website—http://www4.ipdl.jpo.gp.jp/cgi-bin/tran_web_cgi_ejje (28 pages).*
Autozine Thecnical School—Suspension—Copyright 1998–2000 (4 pages).*
European Search Report Dated Oct. 17, 2003.

* cited by examiner

Primary Examiner—D. Glenn Dayoan
Assistant Examiner—H. Gutman
(74) Attorney, Agent, or Firm—Nixon Peabody LLP; Donald R. Studebaker

(57) ABSTRACT

A floor is partitioned into a plurality of areas S1 to S4 by a floor tunnel portion 11, side frames 13, side sills 12, and cross members 7, 8, 15, and 16, and the rigidity of the floor panels of the areas S1 to S3 is adjusted by rigidity adjustment portions 20, 21, 22, 23, and 25. These floor panels are set such that their natural frequency in a 2×1 mode, in which two antinodes are generated in the length direction of the automobile and one antinode is generated in the width direction of the automobile, is 240 to 260 Hz. Thus, a reduction in road noise due to automobile tire cavity resonance is achieved.

22 Claims, 12 Drawing Sheets

FIG. 4
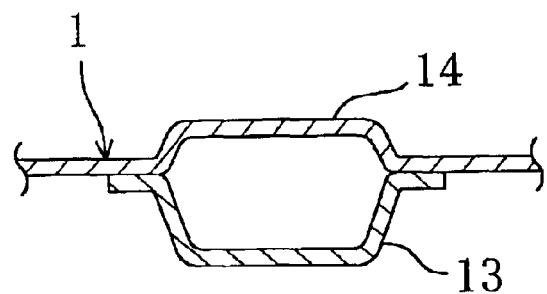
FIG. 5A    1×2 mode
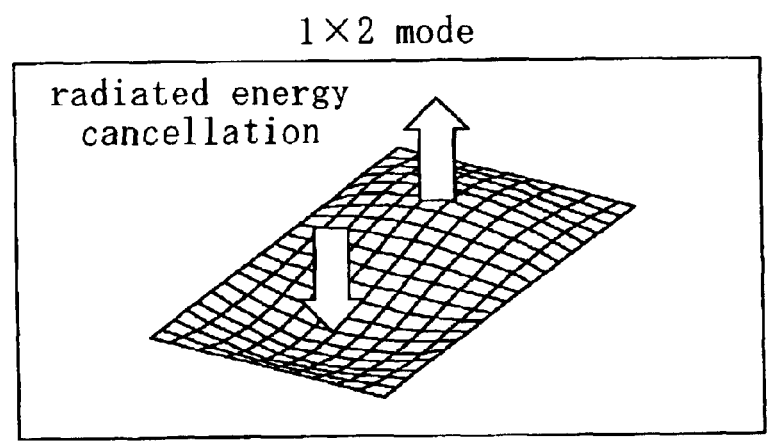
FIG. 5B    2×2 mode
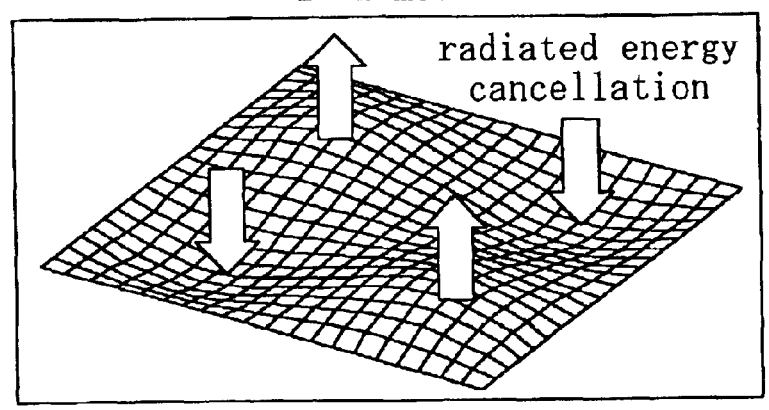

FIG. 6
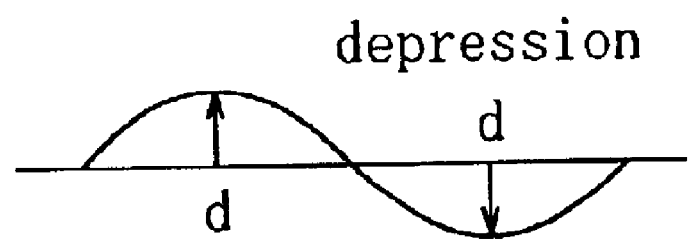
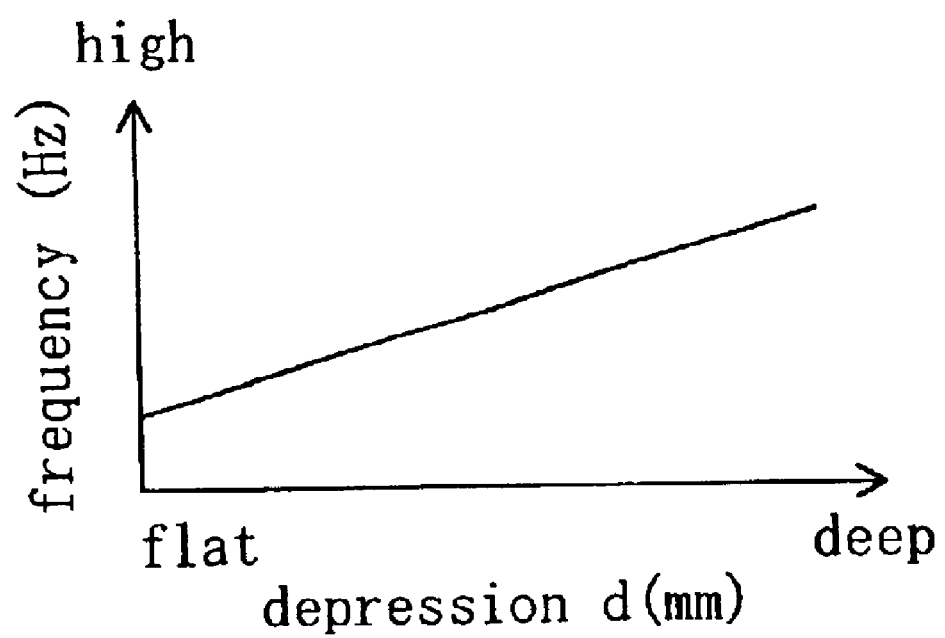

AUTOMOBILE FLOOR STRUCTURE

BACKGROUND OF THE INVENTION

The present invention relates to the structure of an automobile body floor panel and an automobile with this body floor panel, and in particular relates to a body floor panel that excites vibration in a specific mode with a low acoustic radiation efficiency with respect to the input of vibrations in a predetermined frequency band that results in road noise.

Road noise, that is, the noise within an automobile interior that is caused by tire cavity resonance and suspension vibration or the like while the automobile is in motion, is a problem. In general, road noise due to tire cavity resonance peaks in a specific frequency band from 200 to 300 Hz, and road noise due to suspension vibration peaks near 160 Hz. Accordingly, a variety of anti-vibration and anti-noise measures have conventionally been employed at various parts of the automobile body, with particular focus on the floor panel, which is one of the sources of road noise.

For example, numerous beads are formed on the floor panel or the thickness of the panel is increased to raise its surface rigidity and thereby shift its natural frequency to a high frequency band that is higher than 300 Hz. This means that the floor panel is made to not vibrate near 160 Hz, due to suspension vibration, or at the frequency band of tire cavity resonance, and thus road noise is reduced. With these approaches, however, high frequency vibrations subsequently become a problem that requires measures such as attaching sound absorbing material to the floor panel in order to absorb the high frequency noise.

However, the use of large amounts of sound absorbing material increases material costs and makes the automobile body heavier.

In response to these problems, we noticed that sound radiated from a vibrating panel changes significantly depending on the vibration mode, and thus we propose that the floor panel shape and the boundary conditions, for example, are established such that, in specific frequency bands where road noise is a concern, a vibration mode with a low acoustic radiation efficiency is excited. This proposal is described in JP-H09-202269A.

More specifically, the number of antinodes of the stationary waves excited lengthwise and widthwise in a substantially square panel are given as n and m, respectively, and when the vibration mode is n×m=even number, then sounds radiated from opposite phase, adjacent sections in the panel cancel each other out and are reduced. As shown in FIG. 5B, the acoustic radiation efficiency is lowest particularly when the vibration mode is the 2×2 mode.

Accordingly, in the reduced radiation sound structure of the body panel disclosed in the above application, a substantially square region (vibration mode adjustment region) is set at both the left and right sides of the floor tunnel of the body floor panel, and the distribution of surface rigidity in the panel is adjusted so that the vibration mode of the regions is the 2×2 mode. Consequently, even if vibrations of a specific frequency band caused by tire cavity resonance or suspension vibration, for example, are input and resonate the floor panel, road noise resulting from this is sufficiently suppressed and the degree of silence inside the automobile can be increased.

However, as mentioned previously, the frequency bands that result in road noise are very nearly fixed, and establishing a region in which 2×2 mode vibration is excited with respect to vibrations input in these frequency bands requires that a flat surface with a wide area is secured in the floor panel.

In general, however, a floor tunnel portion extending in the length direction of the body is formed in the body floor panel. Moreover, side frames, side sills, and reinforcing members such as cross members are joined to the body floor panel. These not only ensure automobile body rigidity and increase steering stability but are also critical from the standpoint of increasing the automobile's ability to protect passengers during impact. Consequently, it is not possible to make large changes to their dimensions, shape, and layout. Therefore, adopting the above floor panel structure for exciting 2×2 mode vibration for the body of the automobile is difficult to achieve because it is difficult in practice to secure a wide flat surface.

SUMMARY OF THE INVENTION

The present invention has been arrived at in light of these issues, and it is an object thereof to utilize the layout of the floor tunnel portion and side frames, for example, in the floor panel of an automobile and simultaneously set vibration mode adjusted areas within the floor panel to both ensure body rigidity and safety and reduce road noise by adjusting the vibration mode.

To achieve the above objects, in the present invention, an area of a floor panel partitioned by the floor tunnel portion and the various reinforcing members, and which is oblong in the length direction of the automobile body, is made so that a 2×1 mode vibration resulting in two antinodes in the length direction of the automobile and one antinode in the width direction of the automobile is generated, and is adjusted so that the natural frequency of the 2×1 mode is effective in reducing road noise due to tire resonance.

That is, the present invention is for an automobile floor structure in which the automobile floor is partitioned into a plurality of areas by a floor tunnel portion extending in the lengthwise direction of the automobile along the central portion in the automobile width, left and right side sills extending in the lengthwise direction of the automobile body along both side portions of the automobile width, side frames extending in the lengthwise direction of the automobile body between the floor tunnel portion and the left and right side sills, and cross members extending in the automobile width direction, wherein the floor panel of at least one area of the plurality of areas is bound at its perimeter by the one of the side frames, two cross members and the floor tunnel portion or one of the side sills, and has a floor panel structure in which the vibration mode is adjusted so that a 2×1 mode vibration resulting in two antinodes in the lengthwise direction of the automobile body and one antinode in the automobile width direction is generated and the natural frequency of the 2×1 mode is 240 to 260 Hz.

According to the invention, vibration of a 2×1 mode occurs in the vibration mode adjusted floor panel when vibrations of between 240 and 260 Hz are input to the floor panel from the outside. This means that in the floor panel, two sections that are adjacent in the length direction of the automobile vibrate with opposite phase but with the same amplitude, so that there is a considerable drop in the acoustic radiation efficiency and thus road noise between 240 and 260 Hz can be significantly reduced.

The perimeter of the vibration mode adjusted floor panel is bound by the floor tunnel portion and strengthening members (area partitioning members) such as the side frames, and thus it easily forms independent vibration systems and is beneficial in exciting the intended 2×1 vibration mode.

The vibration mode adjusted floor panel is also effectively reinforced by the floor tunnel portion extending in the lengthwise direction of the automobile, the side frames, the side sills, and the cross members that intersect with these and extend in the width direction of the automobile. Thus, the automobile body rigidity and its ability to protect passengers can be adequately ensured.

This means that with the present invention, a floor panel structure is formed that utilizes the automobile body reinforcement structure for increasing the automobile's body rigidity and ability to protect passengers and that employs areas that are partitioned by these reinforcing members (strength members) to generate a 2×1 mode vibration and thereby significantly reduce road noise at 240 to 260 Hz due to tire cavity resonance.

The vibration mode adjusted floor panel can be adjusted to partially increase its rigidity so that stationary wave vibrations in the 2×1 mode are generated at 240 to 260 Hz.

That is, even if a flat panel shape is adopted for the entire floor panel of an area, if the plate thickness is increased to raise the area's rigidity, then its natural frequency can be adjusted to 240 to 260 Hz. However, this results in a heavier automobile body and a considerable increased in the automobile body weight, particularly if the entire panel constituting the floor is press-shaped from a single plate material.

Accordingly, an approach of partially increasing the rigidity of the vibration mode adjusted floor panel is adopted so that the thickness of the entire plate does not have to be increased. As a result, a reduction in road noise can be achieved without a large increase in the body weight. Moreover, because the approach is that of partially increasing the rigidity of the floor panel, the natural frequency can be easily adjusted to a target value during the design stage of the floor panel. Examples of methods for partially increasing the rigidity include partially forming concave or convex portions in the floor panel, partially increasing the plate thickness, and partially joining other members to the floor panel.

The vibration mode adjusted floor panel can be provided with two rigidity adjustment portions with increased surface rigidity and which are lined up in the length direction of the automobile body so that vibrations in the 2×1 mode occur. Also, the floor can be formed so that the periphery of the rigidity adjustment portions is flat.

Consequently, the center of the two rigidity adjustment portions, which have an increased surface rigidity, becomes an antinode and 2×1 mode vibration is generated in the floor panel. Also, the periphery of the rigidity adjustment portions is formed flat and with low rigidity, and the flat portion flexibly deforms in a vertical direction. Thus, coupled vibration is prevented between the floor panel of the area and surrounding area partitioning members or the floor panels of other areas. Also, this configuration is advantageous in generating vibrations in the 2×1 mode. The section between the two rigidity adjustment portions is also formed flat with low rigidity, so that this intermediate flat portion becomes a node where the site forward of it and site to the rear of it easily vibrate with opposite phase. This means that vibrations in the 2×1 mode are more easily produced.

In this case, it is for example possible for the rigidity adjustment portions and the flat portion around them to have the same plate thickness, and also devise each entire rigidity adjustment portion as a concave surface that recesses downward or a convex surface that protrudes upward. It is also possible to provide a bead at the concave or convex surface to further adjust the direction in which the rigidity is increased.

The vibration mode adjusted floor panel can also be provided with a substantially rectangular panel portion that generates a stationary wave vibration of the 2×1 mode at 240 to 260 Hz.

Vibrations in the 2×1 mode occur easily when the floor panel is rectangular. Accordingly, the floor panel is provided with a substantially rectangular panel portion (region) that vibrates in the 2×1 mode when vibration is given from the outside, so that the natural frequency of the panel portion in the 2×1 mode is 240 to 260 Hz.

When the vibration mode adjusted floor panel is non-rectangular in shape, rigidity adjustment portions that have a higher surface rigidity than other sections are provided at the periphery of the non-rectangular floor panel so that a substantially rectangular panel portion that generates 2×1 mode standing wave vibrations at 240 to 260 Hz can be formed in the non-rectangular floor panel.

That is, if the floor panel of the area is non-rectangular in shape, then it is difficult to produce vibration in the 2×1 mode. To remedy this, the area floor panel can conceivably be devised into a shape where vibration in the 2×1 mode easily occurs by altering the shape or positioning of the floor tunnel portion, the side sills, or other area partitioning members. This, however, makes it difficult to effectively reinforce the automobile body and ensure adequate automobile body rigidity and passenger safety.

Accordingly, a rigidity adjustment portion is provided on at least a portion of the floor panel periphery in order to regulate the vibration region of the floor panel. Thus, a substantially rectangular panel portion that generates stationary wave vibrations at 240 to 260 Hz in the 2×1 mode is formed.

It is possible to provide the vibration mode adjusted floor panel with a rigidity adjustment portion that regulates the region in which the floor panel vibrates, so that the ratio of the width edge of the substantially rectangular panel to its length edge is substantially 1:2.

In other words, vibration in the 2×1 mode occurs easily with a rectangular panel having a width to length ratio of substantially 1:2. Accordingly, the floor panel has been provided with a rigidity adjustment portion in order to form a rectangular panel portion (2×1 mode vibration region) with a width to length edge ratio of substantially 1:2.

Adopting this configuration means that whether the floor panel is rectangular or non-rectangular in shape is no longer a concern. Even if the floor panel were rectangular in shape, when the ratio of its oblong width to length sides is not substantially 1:2, it is possible to provide a rigidity adjustment portion at the periphery of the floor panel in order to form a rectangular panel portion in which the width to length ratio is substantially 1:2.

A rigidity adjustment portion can be provided at the periphery of the vibration mode adjusted floor panel in order to suppress coupled vibration between the substantially rectangular panel portion and at least one of the floor tunnel portion, the side sills, the side frames, and the cross members.

That is, the vibration mode adjusted floor panel forms a vibration system separate from the area partitioning members, namely the floor tunnel portion, the side sills, the side frames, and the cross members. It also forms a vibration system separate from the floor panel of other areas. However, these floor panels and area partitioning members easily generate coupled vibration because the elements making up each of the vibration systems are either continuous or joined to one another.

Accordingly, in the present invention, a rigidity adjustment portion that inhibits coupled vibration between the substantially rectangular panel portion and the area partitioning members is provided at the periphery of the vibration mode adjusted floor panel, so that stationary wave vibrations in the 2×1 mode, where the natural frequency is 240 to 260 Hz, are reliably produced in that panel portion.

In this case, the periphery portion of the floor panel (the space outside the 2×1 mode vibration region) can be effectively employed in forming the above rigidity adjustment portion for preventing coupling.

That is, when a substantially rectangular (in particular, having a width to length edge ratio of substantially 1:2) vibration region, such as one that produces 2×1 mode vibration, has been secured in the vibration mode adjusted floor panel, there is often extra space created at the periphery of that floor panel. This space is not only simply extraneous but also disadvantageous for 2×1 mode vibrations. Conversely, from the standpoint of ensuring body strength, for example, it is generally difficult to dispose the area partitioning members in a way that does not result in this extra space. By providing the above rigidity adjustment portion for preventing coupled vibration, this problem is solved, and moreover, effective use of the space can be achieved.

The rigidity adjustment portion in this case can be formed by discontinuously changing the area's surface rigidity at the periphery of the vibration region (the substantially rectangular panel portion). For example, a structural bead (protruding bar having a U-shaped or V-shaped cross section) that extends in the length direction of the body or the width direction of the automobile and is perpendicular to the direction in which the 2×1 mode vibration waves advance (in this case, these are stationary waves, so that two waves of equal wavelength and amplitude advance in opposite directions) can be formed by press-shaping.

In this case, the area becomes easily bent about the structural bead, that is, there is diminished bending rigidity with respect to bending about the structural bead, so that vibrations in the area are not easily transferred between the vibration region side and the outside (area partitioning member side), and thus coupled vibration is avoided.

The floor panel can be formed by press-shaping a single metal plate that has the total width of that between the left and right side sills, including the floor tunnel portion. At this time, the rigidity adjustment portion can be formed on the panel as a structural bead that extends in the width direction of the automobile.

Press-shaping a single metal plate with the total width of the floor panel, including the floor tunnel portion, means that in principle the floor tunnel portion bulges outward, and the material at that time flows in the width direction of the automobile.

Taking this into consideration, the rigidity adjustment portion is given as a structural bead that extends in the width direction of the automobile, so that the plastic flow of the material during press-shaping takes places smoothly. That is, if the rigidity adjustment portion is a structural bead that extends in the length direction of the automobile body, then the bead portion hinders the plastic flow of the material during press-shaping and shape defects tend to occur, however, by making it a structural bead that extends in the width direction of the automobile, the bead portion does not obstruct the press-shaping properties.

When the vibration mode adjusted floor panel is non-rectangular in shape, a plurality of structural beads that extend in the width direction of the automobile can be provided in a line in the length direction of the body with a spacing therebetween, so as to regulate the width of the vibration region (dimensions in the width direction) of that floor panel in order to form a substantially rectangular panel portion in the floor panel. In particular, it is possible to form a rectangular panel portion (2×1 mode vibration portion) that is oblong in the length direction of the body by arranging the beads so that the position of their end on the vibration region side lines up in a straight line in the length direction of the body.

For example, if the floor panels of areas adjacent to the floor tunnel portion are vibration mode adjusted floor panels, then a spacing in the length direction can be provided between the plurality of beads extending in the automobile width direction spanning from the floor panel to the floor tunnel, and the end portions of the beads can be positioned on the border line of the 2×1 mode vibration region.

Also, the present invention is characterized in that the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and cross members extending in the automobile width direction, and a floor panel of at least one area of the plurality of areas is bound at its perimeter by one of the left and right side sills, two cross members and the floor tunnel portion or one of the left and right side frames, and has a floor panel structure in which a vibration mode is adjusted such that a 2×1 mode vibration resulting in two antinodes in the lengthwise direction of the automobile body and one antinode in the automobile width direction is generated and a natural frequency of the 2×1 mode is substantially matched to a cavity resonance frequency of the automobile tires.

Consequently, road noise resulting from tire cavity resonance can be significantly reduced through 2×1 mode vibration by utilizing the floor reinforcement structure of the automobile body for increasing the body rigidity of the automobile and the automobile's ability to protect passengers while employing the areas that are partitioned by these reinforcing members (strengthening members).

The present invention is also characterized in that the automobile floor is partitioned into a plurality of areas by a floor tunnel portion extending in the lengthwise direction of the automobile along a central portion in the automobile width, left and right side sills extending in the lengthwise direction of the automobile body along both side portions of the automobile width, side frames extending between the floor tunnel portion and the left and right side sills in the lengthwise direction of the automobile body, and cross members extending in the automobile width direction, and a floor panel of at least one area of the plurality of areas is bound at its perimeter by one of the left and right side sills, two cross members and the floor tunnel portion or one of the left and right side frames, and has a floor panel structure in which a vibration mode is adjusted such that a 2×1 mode vibration resulting in two antinodes in the lengthwise direction of the automobile body and one antinode in the automobile width direction is generated and a natural frequency of the 2×1 mode is 200 to 300 Hz.

In other words, the tire cavity resonance frequency of an automobile is generally within a range of 200 to 300 Hz, although this differs depending on the type of tire that has been equipped to the automobile (for example, tire width, tire diameter, compression, air pressure), the speed of the automobile, and the atmosphere temperature. Therefore, in the present invention, a floor panel structure in which the vibration mode has been adjusted so that the natural frequency of the 2×1 mode is 200 to 300 Hz has been adopted. Thus, a reduction in road noise due to tire cavity resonance can be achieved.

The vibration mode adjusted floor panel can be set between the floor tunnel portion and the side frames underneath the automobile front seats.

With this configuration, the vibration mode adjusted floor panels are disposed underneath the front seats, so that road noise emanating from below the front seats to the passengers sitting therein is effectively reduced. Also, the floor panels are hidden below the front seats, so that 2×1 mode vibration is prevented from being transferred to the feet of passengers sitting in the front seats. Conversely, the feet of passengers are not allowed to interfere with the 2×1 mode vibration in the floor panel. Thus, this configuration is advantageous in reducing radiated noise.

The vibration mode adjusted floor panel can also be formed on both sides of the side frames.

Thus, it is possible to achieve a reduction in radiated noise by effectively utilizing the areas, which are oblong in the length direction of the body, on either side of the side frames.

It is possible to adjust the rigidity of the floor panel of areas of the plurality of areas other than those in which the floor panel has been given a vibration mode adjusted floor panel structure, so that its natural frequency is higher than 300 Hz.

That is, although all of the plurality of areas can be given a vibration mode adjusted floor panel structure, there may also be areas in which it is difficult to generate effective 2×1 mode vibrations due to the relationship of the layout, for example, of the reinforcing members. Accordingly, in these areas, the rigidity of the floor panel is adjusted so that the panel has a natural frequency that is higher than 300 Hz, and therefore the panels avoid resonating with respect to external vibration equal to or less than 300 Hz, and a reduction in radiated sound is achieved.

In an automobile that has been provided with the above floor structure, making the front suspension a double wishbone suspension is beneficial in increasing silence within the interior of the automobile.

As mentioned above, the vibration mode adjusted floor panel is highly effective in reducing radiated sound when vibrations between 200 and 300 Hz are input, however, in an automobile the peak of road noise due to suspension resonance appears around 160 Hz. This road noise is particularly conspicuous with a Macpherson strut suspension (hereinafter, referred to just as strut suspension). This is because with this type of suspension, the bottom end of the damper, the top end of which is joined to the automobile body, is rigidly joined to the knuckle/spindle, so that while the automobile is in motion, front-to-rear and side-to-side vibrations are easily transferred to the automobile body from the knuckle/spindle via the damper.

In contrast, in the case of a double wishbone suspension, an upper arm and a lower arm are joined to the upper and lower ends of the knuckle/spindle by ball joints, and the bottom end of the damper is joined to the upper or lower arm by a ball joint. Therefore, front-to-rear and side-to-side vibrations that are delivered to the damper from the knuckle/spindle via the upper or lower arm are absorbed by vibration of the damper about the point where its upper end is attached to the automobile body, and thus are not easily transferred to the automobile body. Thus, road noise near 200 to 300 Hz is suppressed by vibrations in the 2×1 mode of the vibration mode adjusted floor panel, and road noise near 160 Hz is also diminished. Thus, this configuration is advantageous in increasing the silence within the automobile interior.

Furthermore, the present invention is characterized in that the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and a plurality of cross members extending in the automobile width direction, a floor panel of at least one area of the plurality of areas is bound at its left and right by one of the side frames and either the floor tunnel portion or one of the side sills, formed in a substantially rectangular shape that is bound at its front and back by two cross members and oblong in the lengthwise direction of the automobile body, and has long sides that are formed more than twice as long as its short sides, and the floor panel is provided with a pair of curved surface portions, which are formed in an elliptical shape with a perimeter that is oblong in the lengthwise direction of the automobile body and protrude upwards or downwards, and are lined up in the lengthwise direction of the automobile body with coinciding long axes, and the floor panel has a floor panel structure in which a vibration mode is adjusted such that a 2×1 mode vibration resulting in two antinodes in the lengthwise direction of the automobile body and one antinode in the automobile width direction is generated and a natural frequency of the 2×1 mode is substantially matched to a tire cavity resonance frequency of the automobile.

In the present invention, when a vibration induced by the tire cavity resonance is input to the floor panel, a 2×1 mode vibration, in which the two elliptical curved surface portions that are adjacent to one another in the lengthwise direction of the automobile body vibrate out of phase and at the same frequency, is generated in the floor panel, and thus the acoustic radiation efficiency is severely diminished, so that road noise due to tire cavity resonance can be significantly diminished.

Furthermore, in a case where the floor panel is rectangular in shape and enclosed by the above strengthening members, an ideal rectangle for generating the 2×1 mode vibration is a 2×1 rectangle in which the long sides are twice the length of the short sides. However, depending on the automobile, the layout of the floor tunnel portion, the side sills, the side frames, and the cross members may not allow a floor panel that is surrounded by these strengthening members to become a 2×1 rectangle, and for example, the floor panel may be closer in shape to a 3×1 rectangle, in which case it is difficult to generate a 2×1 mode vibration.

To explain this in greater detail, even if the floor panel is not a 2×1 rectangle, as long as it is close in shape to a 2×1 rectangle, it is possible to provide a floor panel that is substantially a 2×1 rectangle by providing beads and other reinforcing members at its periphery portion. However, if the floor panel is close in shape to a 3×1 rectangle, then the region that remains after reinforcing beads extending in the width direction of the automobile are provided and the floor panel has been partitioned to form a 2×1 rectangular region, has its own characteristic vibration, or coupled vibration is generated between the region that remains and the 2×1 rectangular region, which is unfavorable with regard to reducing the anticipated road noise through 2×1 mode vibration.

Also, as was mentioned above, if the floor panel is a long and thin rectangle, then the bending rigidity in the lengthwise direction of the automobile body (the bending rigidity when the panel bends about an axis in the width direction of the automobile body) is lower than the bending rigidity in the width direction of the automobile body (the bending rigidity when the panel bends about an axis in the lengthwise direction of the automobile body).

Accordingly, in the present invention, the pair of curved surface portions that line up in the lengthwise direction of the automobile body are formed in a substantially rectangular floor panel portion with long sides twice as long as its short sides, have a planar shape that is elliptical and oblong in the lengthwise direction of the automobile body, and increase the bending rigidity in the lengthwise direction of the automobile.

Thus, a 2×1 mode vibration in which the pair of elliptical curved surface portions vibrate up and down in opposite phase to one another is generated in the floor panel, and the curved surface portions are ellipses that are oblong in the lengthwise direction of the automobile body. This is advantageous for substantially matching the natural frequency of the 2×1 mode to the tire cavity resonance frequency.

That is, it is not necessary to provide elliptical curved surface portions if the object is only to achieve 2×1 mode vibration, and for example, the curved surface portions could conceivably be given a substantially rectangular perimeter. However, in order to reduce road noise due to cavity resonance, the surface rigidity of the floor panel must be effectively increased to substantially match its natural frequency in the 2×1 mode with the cavity resonance frequency.

Here, the case of the present invention, where the curved surface portions have an elliptical perimeter instead of a rectangular perimeter, is advantageous in increasing the surface rigidity of the floor panel, because the perimeter of the curved surface portions bypasses the corners of the rectangular floor panel and extends obliquely to link the middle portion of the long sides of the floor panel to the middle portion of the short sides of the floor panel. Moreover, because the curved surface portions according to this invention are ellipses that are oblong in the lengthwise direction of the automobile body instead of having a perfectly circular perimeter, the bending rigidity of the floor panel in the lengthwise direction of the automobile body is effectively increased. Thus, the present invention is advantageous for increasing the natural frequency of the 2×1 mode so that it is substantially matched to the cavity resonance frequency.

Furthermore, the present invention is characterized in that the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and a plurality of cross members extending in the automobile width direction, a floor panel of at least one area of the plurality of areas is bound at its left and right by one of the side frames and either the floor tunnel portion or one of the side sills, formed in a substantially rectangular shape that is bound at its front and back by two cross members and oblong in the lengthwise direction of the automobile body, and has long sides that are formed more than twice as long as its short sides, and the floor panel is provided with a pair of curved surface portions that are formed in an elliptical shape with a perimeter that is oblong in the lengthwise direction of the automobile body and protrude upwards or downwards, and that are lined up in the lengthwise direction of the automobile body with coinciding long axes, and the floor panel has a floor panel structure in which a vibration mode is adjusted such that a 2×1 mode vibration resulting in two antinodes in the lengthwise direction of the automobile body and one antinode in the automobile width direction is generated and a natural frequency of the 2×1 mode is 200 to 300 Hz.

In other words, the tire cavity resonance frequency is generally within a range of 200 to 300 Hz, although this differs depending on the type of tire that has been equipped to the automobile (for example, tire width, tire diameter, compression, air pressure), the speed of the automobile, and the atmosphere temperature. Thus, with the present invention, a pair of elliptical curved surface portions that are oblong in the lengthwise direction of the automobile body are provided in the floor panel and are lined up in the lengthwise direction of the automobile body with coinciding axes, so that a 2×1 mode vibration is generated and the rigidity of the floor panel is adjusted so that the natural frequency of the 2×1 mode is established at 200 to 300 Hz.

Thus, a reduction in road noise due to tire cavity resonance can be effectively achieved.

It is also possible to set the natural frequency of the 2×1 mode to 220 to 240 Hz.

That is, as was mentioned above, although the tire cavity resonance frequency may differ depending on the type of tire that has been equipped to the automobile and the speed of the automobile, for example, in the case of a sports car or the like, the tire cavity resonance frequency is near 230 Hz because of the relationship between, for example, the diameter and the compression of the tires that have been equipped and the automobile speed at which the reduction in road noise is to be achieved. Consequently, the present invention can be adopted for an automobile with a comparatively low tire cavity resonance frequency in order to effectively achieve a reduction in the road noise of that automobile.

It is preferable that each of the pair of elliptical curved surface portions has a large radius of curvature at its central portion and a small radius of curvature at its periphery portion.

Thus, the periphery portion of the elliptical curved surface portions is more upright and has increased rigidity, and this is advantageous for increasing the natural frequency of the 2×1 mode so that it matches the cavity resonance frequency of the tires.

It is preferable that, when viewed from above, the ends of the long axis of the pair of elliptical curved surface portions are in contact with one another or that the ends of the long axes are overlapping.

If the pair of elliptical curved surface portions are shaped so that they are in contact with or overlap with one another, then the curved surface portions can be made larger, and this is advantageous with regard to increasing the rigidity of the floor panel portion so that the natural frequency of the 2×1 mode is substantially matched to the cavity resonance frequency of the tires. Also, even when their shape is such that they overlap, only the end portions of the long axis of the pair of elliptical curved surface portions overlap with one another, and because the shape of the central portion becomes a narrowed gourd-shape if the entirety of both recesses is viewed from above, the narrowed central portion becomes a node and 2×1 mode vibration in which both sides of the node vibrate at an opposite phase can be ensured.

It is preferable that an intermediate bead extending in the lengthwise direction of the automobile body and narrower in width than the short axis of the ellipse is formed in the floor panel, so as to link the end portions of the long axis of the pair of elliptical curved surface portions to one another.

That is, as mentioned above, because the floor panel has a low bending rigidity in the lengthwise direction of the automobile body, its central portion (the site between the adjacent elliptical curved surface portions) becomes severely distorted when vibrated, and that distortion can adversely affect the 2×1 mode vibration.

If an intermediate bead is provided, then, because the rigidity of the central portion of the floor panel is increased, and particularly because the intermediate bead extends in the lengthwise direction of the automobile body, the intermediate bead is effective in increasing the bending rigidity of the floor panel in the lengthwise direction of the automobile body and is advantageous for obtaining 2×1 mode vibration with little distortion, and moreover, it is advantageous for substantially matching the natural frequency of the 2×1 mode vibration to the tire cavity resonance frequency. Also, the width of the intermediate bead is shorter than the short axis of the ellipse, so that both recessed portions and the intermediate bead together produce a gourd-shaped outline in which the intermediate bead is the site that is narrowed, and this is advantageous for 2×1 mode vibration in which the site of the narrowed intermediate bead serves a node.

It is preferable that end portion beads extending in the lengthwise direction of the automobile body are formed in the floor panel at the edge of each elliptical curved surface portion in the direction of its long axis on the side opposite the intermediate bead.

Thus, because of the intermediate bead and the end portion beads, a balance can be achieved in the rigidity of the front and rear end portions of the elliptical curved surface portions, and this is advantageous for orderly vibrating the elliptical curved surface portions up and down without distortion in order to obtain vibration in the 2×1 mode.

It is further preferable that lateral portion beads extending in the lengthwise direction of the automobile body are formed in the floor panel at the side edge of each elliptical curved surface portion.

Thus, the lateral portion beads can be employed to balance the rigidity of both sides of the elliptical curved surface portions, and this is advantageous for vibrating the elliptical curved surface portions vertically in an orderly fashion without distortion in order to obtain vibration in the 2×1 mode.

If the floor panel is bound on its left and right by a side frame and a side sill, the lateral portion beads can be disposed not of the side of the side sills but on the side of the side frames, which have a low degree of binding with respect to the floor panel, so as to balance the rigidity of both sides of the elliptical curved surface portions. Thus, this is advantageous for vibrating each elliptical curved surface portion vertically in an orderly fashion without distortion in order to obtain vibration in the 2×1 mode.

It is preferable that if the floor panel is the above long and thin rectangle, then a rigidity adjustment means, such as the elliptical curved surface portions, the intermediate bead, the end portion beads, and the lateral portion beads, that functions to increase the bending rigidity in the lengthwise direction of the automobile body more so than to increase the bending rigidity in the width direction of the automobile body is provided.

As mentioned above, the floor panel is substantially rectangular in shape and oblong in the lengthwise direction of the automobile body, so that its bending rigidity in the lengthwise direction of the automobile body is lower than its bending rigidity in the width direction of the automobile body. Therefore, by providing a rigidity adjustment means, the rigidity at the front, rear, left, and right of the floor panel can be balanced while its overall rigidity can be increased. This is advantageous for substantially matching the natural frequency of the 2×1 mode to the tire cavity resonance frequency.

In a two-door type automobile, or in a four-door type hinged double door automobile in which the rear doors are more narrow than the front doors, there is a wide space between the cross member at the front end of the floor and the cross member behind it, and a floor panel that is bound by these two front and rear cross members is easily provided substantially rectangular in shape with long sides in the lengthwise direction of the automobile body twice the length of its short sides.

Thus, adjusting the vibration mode of the floor panel of this type of automobile using the pair of elliptical curved surface portions proves advantageous in achieving a reduction in road noise caused by tire cavity resonance.

The present invention is also characterized by a method of designing an automobile floor panel, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and a plurality of cross members extending in the automobile width direction, and a floor panel of at least one area of the plurality of areas is bound at its left and right by one of the side frames and either the floor tunnel portion or one of the side sills, formed in a substantially rectangular shape that is bound at its front and back by two cross members and oblong in the lengthwise direction of the automobile body, and has long sides that are formed more than twice as long as its short sides, the method of designing an automobile floor panel including:

a step of designing a basic floor panel structure in which a 2×1 mode vibration resulting in two antinodes in the lengthwise direction of the automobile body and one antinode in the automobile width direction is generated by disposing, in the floor panel, a pair of curved surface portions that are formed in an elliptical shape with a perimeter that is oblong in the lengthwise direction of the automobile body and protrude upwards or downwards, and that are lined up in the lengthwise direction of the automobile body with coinciding long axes, and a step of increasing a natural frequency of the 2×1 mode by providing a groove-shaped structural bead that extends in the lengthwise direction of the automobile body and is narrower in width than the short axis so as to link the end portions of the long axis of the pair of elliptical curved surface portions to one another, and of tuning the natural frequency to substantially match the tire cavity resonance frequency of the automobile by adjusting the depth of the groove-shaped structural beads.

As mentioned above, forming a pair of elliptical curved surface portions in a flat, rectangular floor panel is effective in generating 2×1 mode vibration. However, in order to reduce road noise due to tire cavity resonance, the rigidity of the floor panel must be increased so that the natural frequency of the 2×1 mode is substantially matched to the tire cavity resonance frequency. With regard to this, the inventors found that the rigidity of the floor panel can be easily increased by providing groove-shaped structural beads linking the two elliptical curved surface portions in the floor panel. The inventors also found that the rigidity of the panel is easily altered by changing the depth of the groove of the structural beads.

Accordingly, in the present invention, the natural frequency of the 2×1 mode is increased by providing groove-shaped structural beads, and the natural frequency is tuned so that it is substantially matched to the tire cavity resonance frequency of the automobile by adjusting the depth of the groove-shaped structural beads.

Consequently, with this method of designing a floor panel, the natural frequency in the 2×1 mode of the floor panel can be easily matched to the target tire cavity resonance frequency by adjusting the depth of the groove-shaped structural beads. Moreover, the same basic floor panel shape can be adopted even when the tire cavity resonance frequency differs because of the automobile speed and the tire type, and thus the floor panel can be easily designed.

BRIEF DESCRIPTION OF THE DRAWINGS

FIG. 4 is a cross-sectional view that shows the configuration of the side frames of Embodiment 1.

FIG. 5 is a diagram of radiated sound cancellation in the vibration mode adjusted region.

FIG. 6 is a graph showing the relationship between the depth of the recession formed in the panel of Embodiment 1 and the resonance frequency.

DETAILED DESCRIPTION OF THE INVENTION

Hereinafter, preferred embodiments of the present invention will be described with reference to the drawings.

Embodiment 1

Figure 1:
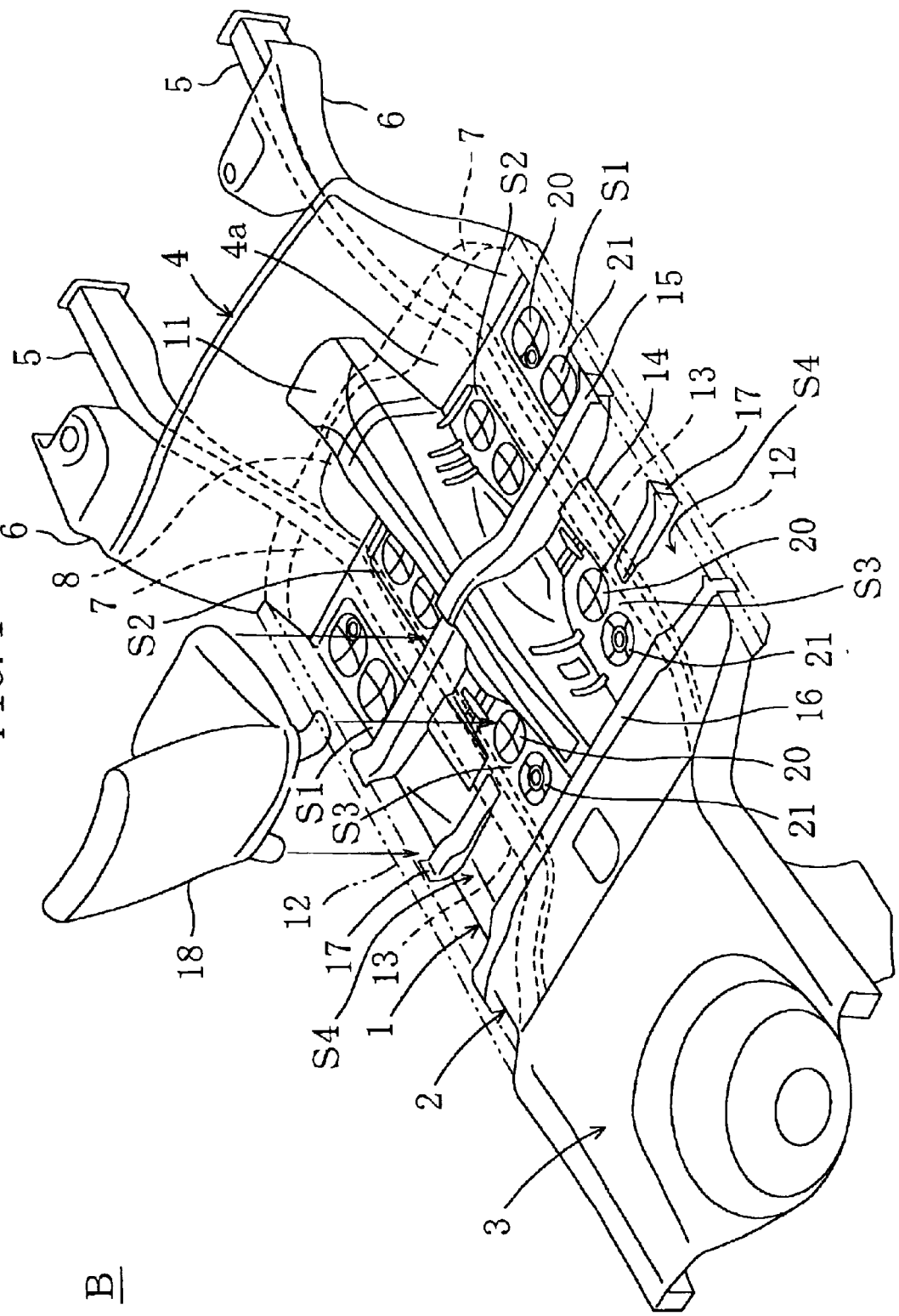
FIG. 1 is a perspective view of the automobile underbody according to Embodiment 1.

FIG. 1 shows the underbody B of an automobile in which the reduced sound radiation structure according to the present invention has been adopted for the floor. The underbody B of this automobile is provided with a front floor panel 1 making up the floor portion of the car interior, a center floor panel 2 disposed one stage higher to the rear of the automobile from the front floor panel 1 and on which a rear seat not shown in the drawing is disposed, and a rear floor panel 3 disposed one stage higher to the rear of the automobile from the center floor panel 2 and which makes up the floor portion of the trunk. Also, the bottom edge portion of a dash panel 4, which separates the automobile interior from the engine room, is joined to the edge portion of the front floor panel 1 on the front side of the automobile by spot welding or the like. Moreover, a pair of front side frames 5, 5 and a pair of fender aprons 6, 6 are provided in front of the dash panel 4 such that they enclose both the left and right sides of the engine room.

Figure 2:
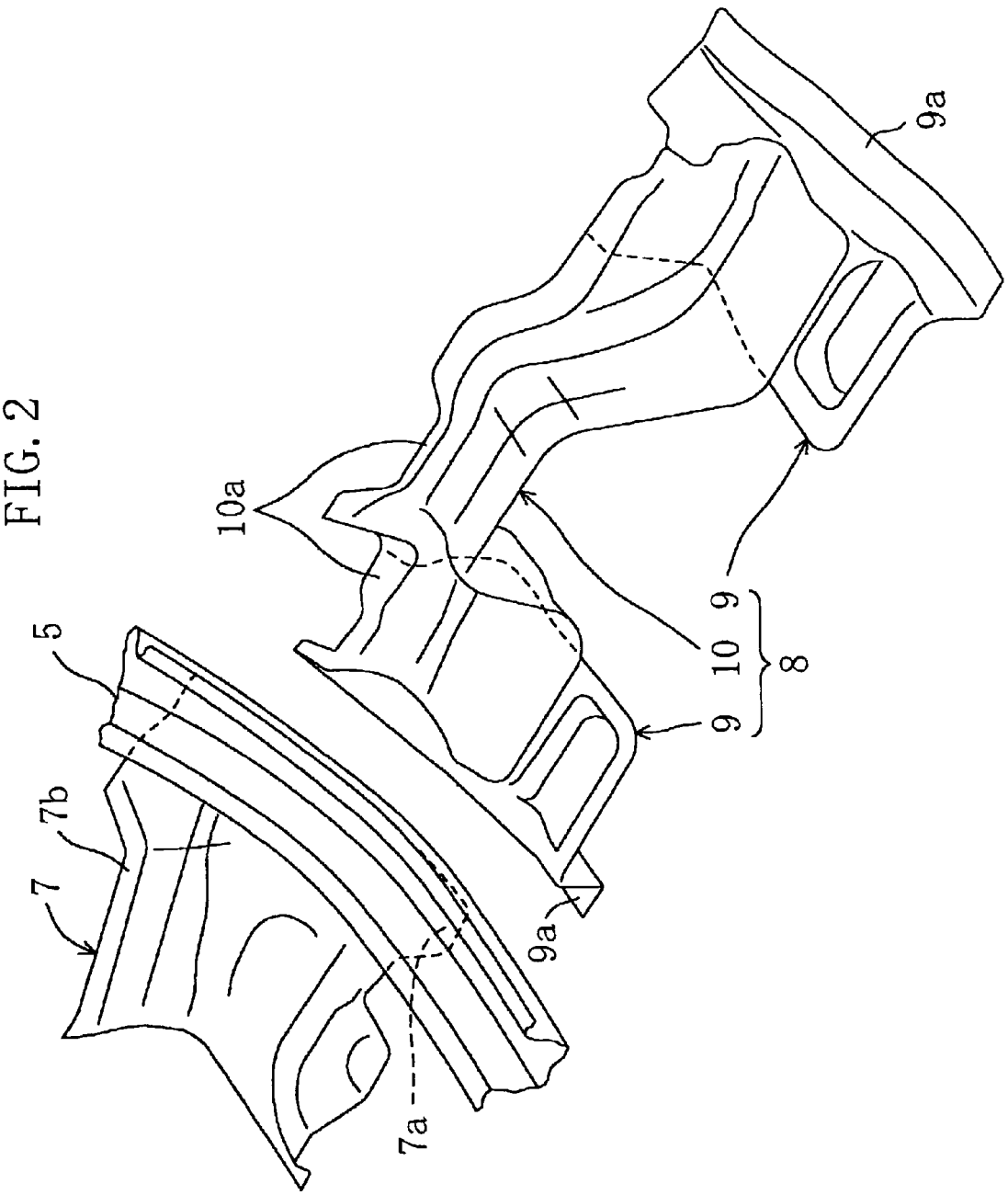
FIG. 2 is a perspective view of the torque box member and dash lower cross member that are attached to the dash panel of Embodiment 1.

The bottom side portion of the dash panel 4 is a sloped portion 4a that is sloped such that the closer it approaches the bottom edge, the more it is positioned toward the rear of the automobile body. Also, a recessed portion that opens downward is formed substantially in the center of the sloped portion 4a in the automobile width direction, corresponding to a floor tunnel portion 11 of the front floor panel 1. The pair of front side frames 5, 5 each extends from the bottom edge portion of the dash panel 4 forward and obliquely upward along the sloped portion 4a and separates from the dash panel 4 near the top edge of the sloped portion 4a, extending substantially horizontally from there toward the front of the automobile. Although not shown in detail, the portion of each front side frame 5 on the front side of the automobile is formed in a quadrangular pillar that has a substantially rectangular closed cross section and is made by combining two members, each made of a steel plate with a bracket-shaped cross section, from the left and right. On the other hand, as shown in FIG. 2, the portion of each front side frame 5 on the rear side of the automobile has a structure with a substantially rectangular closed cross section and is made by overlapping a member made of a steel plate and having a bracket-shaped cross section to the sloped portion 4a of the dash panel 4 from below.

Reinforcing members are attached from below to the sloped portion 4a of the dash panel 4 such that they sandwich the front side frame 5 on the left and right. That is, as shown in FIG. 2, torque box members 7, 7 (only one is shown in FIG. 2) having a substantially L-shaped cross section are disposed at each front side frame 5 on the side of the body exterior (left side in drawing), and a body interior side flange 7a of each torque box member 7 is joined to the front side frame 5, while a body front side flange 7b of the torque box 7 is joined to the sloped portion 4a of the dash panel 4. The sloped portion 4a and the torque box 7 together form a closed cross section structure that extends in the width direction of the automobile.

Also, a dash lower cross member 8 is disposed such that it is sandwiched on the left and right between the pair of front side frames 5, 5. The dash lower cross member 8 is a combination of left and right side members 9, 9, which have a substantially L-shaped cross section, and an intermediate member 10 that links the members 9, 9. Body exterior side flanges 9a, 9a of the left and right members 9, 9 are each joined to the front side frames 5, 5, and a body front side flange 10a of the intermediate member 10 is joined to the sloped portion 4a of the dash panel 4. The sloped portion 4a and the dash lower cross member 8 together form a closed cross section structure that extends in the width direction of the automobile.

For the sake of convenience, hereinafter the torque box members 7, 7 and the dash lower cross member 8 are referred to as the No. 1 cross member.

Figure 3:
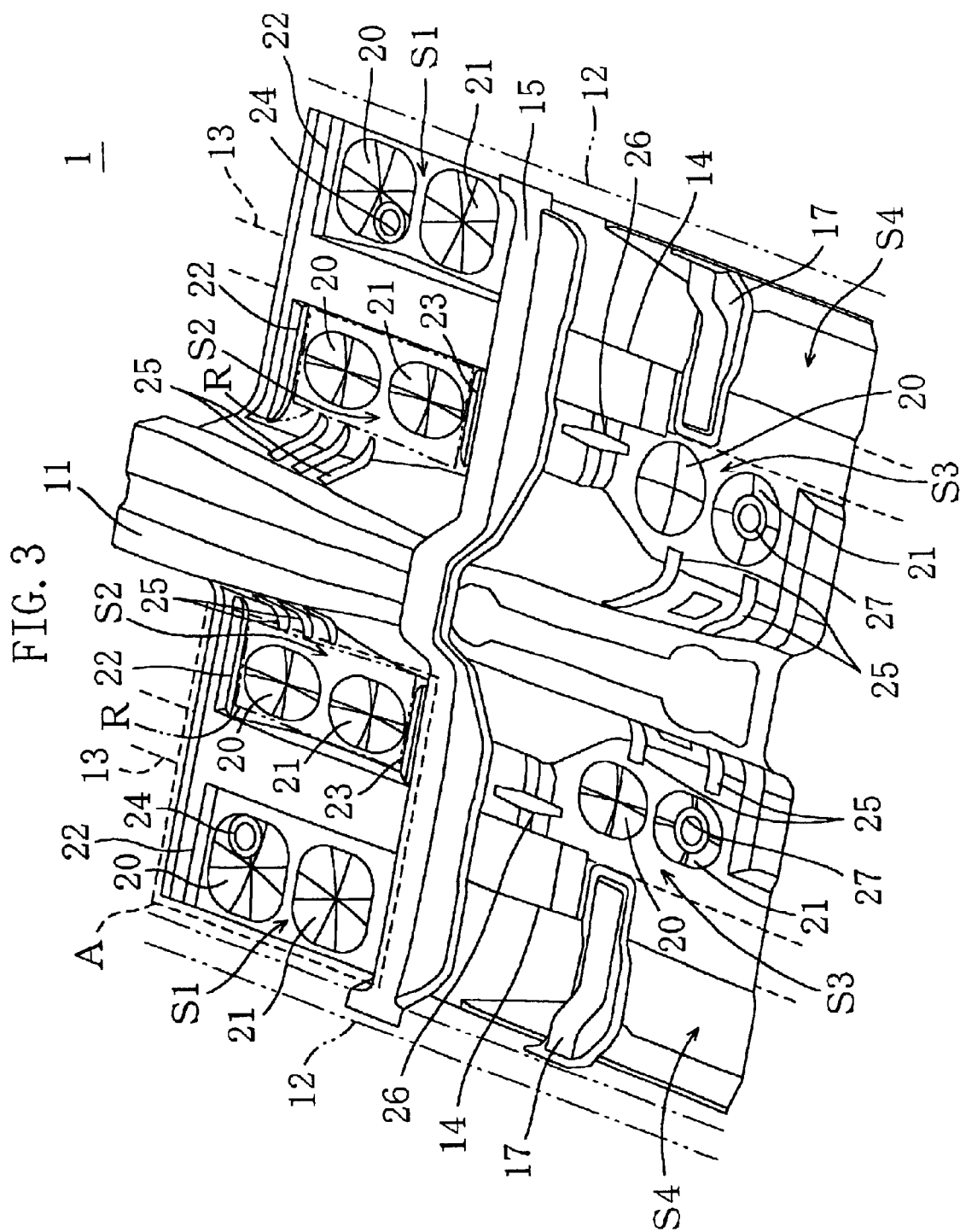
FIG. 3 is a magnified perspective view of the front floor panel of Embodiment 1.

As shown in FIG. 3, the front floor panel 1 is a press-shaped steel plate of a predetermined thickness (for example, a thickness of 0.65 to 0.7 mm), and is formed into a single piece with the floor tunnel portion 11, which bulges upward at the substantially central position in the width direction of the automobile and extends in the length direction of the body. Also, both end sides in the width direction of the front floor panel 1 are made so that an automobile side body (not shown) can be attached thereto, and side sills 12, 12 (illustrated by the phantom line), which have a closed cross section structure and extend in the length direction of the automobile body along the bottom edge portion of the side body, are joined to the front floor panel 1 by spot welding, for example. That is, the front floor panel 1 is made by press-shaping a single metal sheet of the total width between the left and right side sills 12, 12 including the floor tunnel portion 11.

Floor side frames 13, 13 are provided between the floor tunnel portion 11 and each side sill 12, 12 and extend in the length direction of the automobile body. Each floor side frame 13, like the rear portion of the front side frames 5, forms a substantially rectangular closed cross section and is made by combining a member, made by a steel plate with a bracket-shaped cross section, to the bottom surface of the front floor panel 1 from below. As shown in FIG. 4, to ensure the closed cross section area, a protruding portion 14 that protrudes upward is formed at the site of the front floor panel 1 that corresponds to the front side frame 5. This protruding portion 14 extends in the length direction from the front edge portion of the front floor panel 1 to a predetermined location behind the central position in the length direction of the automobile body. Also, the front end portions of the floor side frames 13, 13 are connected to the rear end portions of the front side frames 5, 5.

That is, in addition to the centrally located floor tunnel portion 11 and the left and right end side sills 12, 12, the front floor panel 1 is also provided with the floor side frames 13 and the protruding portions 14, which are substantially in the center between the floor tunnel portion 11 and the side sills 12, to serve as reinforcement in the length direction of the automobile body. Thus, sufficient bending rigidity and twisting rigidity of the automobile body is ensured while deformations of the automobile interior due particularly to head-on automobile collisions are minimized in order to reliably protect the passengers.

On the other hand, to serve as reinforcement in the width direction of the automobile, there is the previously mentioned No. 1 cross member (torque box members 7 and the dash lower cross member 8) for reinforcing the front end portion of the front floor panel 1. In addition to this, a No. 2 cross member 15 that extends in the width direction of the automobile such that it spans the floor tunnel portion 11, and a No. 3 cross member 16 that extends in the automobile width direction along the juncture between the rear end edge portion of the front floor panel 1 and the center floor panel 2, are also disposed in the substantially central position in the length direction of the front floor panel 1. The No. 2 cross member 15 is a member with a bracket-shaped cross section that opens downward and is joined to the top surface of the front floor panel 1. Its substantially central portion in the width direction of the automobile bends upward in correspondence with the shape of the floor tunnel portion 11, whereas its left and right edge portions are joined to the side sills 12, 12.

A reinforcement member 17 that also serves as the mount for the front seats is disposed between the No. 2 cross member 15 and the No. 3 cross member 16. FIG. 1 shows only a left front seat 18, which is disposed slightly removed of the top of the No. 2 cross member 15 toward the rear of the automobile body. The reinforcement member 17, which extends in the automobile width direction, is disposed bridging from the floor side frames 13 to the side sills 12 at a position near the rear end portion of the cushion for the front seat 18. Although not shown in the drawings, the two attachment members in front of the seat cushion are fastened to the No. 2 cross member 15, whereas one of the two attachment members to the rear is fastened to the reinforcement portion 17 and the other is fastened to the floor tunnel portion 11. Thus, the automobile's ability to protect front seat passengers against side collisions is improved by the reinforcement member 17 disposed below the front seat.

With the above configuration, the floor made by the front floor panel 1 is partitioned into eight areas, each of a substantially rectangular or near rectangular shape, by the floor tunnel portion 11, the floor side frames 13, 13 (protruding portions 14, 14) and the side sills 12, 12, which all extend in the length direction of the automobile, and the cross members 7, 8, 15, and 16, which each extend in the width direction of the automobile.

Moreover, the present invention is characterized in that the floor panels of six areas S1 to S3 of the eight areas are structured as vibration mode adjusted floor panels, which excite a specific vibration mode of a low acoustic radiation efficiency with respect to vibrations input in a predetermined frequency band (240 to 260 Hz), and in particular to vibrations input at approximately 250 Hz (hereinafter, the areas S1 to S3 are also referred to as vibration mode adjusted areas). The rigidity of the floor panels of the remaining two areas S4 of the eight areas is adjusted so that the panel's natural frequency is at least 300 Hz.

A detailed description of a vibration mode with a low acoustic radiation efficiency is given in the conventional example (JP-H09-202269). Here, when the number of antinodes of the stationary waves excited lengthwise and widthwise in a rectangular region are given as n and m, respectively, then as shown in the example in FIG. 5, if n×m=even number, then the sounds radiated from sections of opposite phase that are adjacent in the panel cancel each other out and there is a significant drop in the acoustic radiation energy.

That is, with the 2×1=2 vibration mode shown in FIG. 5A, two sections in the panel vibrate with opposite phase but with equal amplitudes and the radiated sounds cancel each other out. With the 2×2=4 vibration mode shown in FIG. 5B, sounds radiated from four sections in the panel cancel each other out, and it is at this time that the acoustic radiation efficiency is lowest.

As illustrated above, according to the present embodiment, the rigidity of the underbody B is increased through effectively utilizing the layout of the reinforcement structure, such as the frames and cross members that are disposed in the length direction of the automobile and in the width direction of the automobile, respectively. Also, the floor panels of the areas S1 to S3, which are oblong in the automobile lengthwise direction, on the front floor panel 1 are configured to excite 2×1 mode vibration, in which stationary waves in the lengthwise direction have two antinodes and stationary waves in the width direction have one antinode.

More specifically, as is shown by FIG. 3, the first areas S1, S1 are each partitioned on the left and right sides of the floor tunnel portion 11 by the front side frames 13 (and protruding portions 14), the side sills 12, the torque box member 7, and the No. 2 cross member 15. Moreover, the border of the floor panel of the first areas S1, S1 is bound by these area partitioning members.

The second areas S2, S2 are positioned inward of the first areas S1, S1 toward the automobile inside, and are partitioned by the floor tunnel portion 11, the floor side frames 13 (and protruding portions 14), the dash lower cross member 8, and the No. 2 cross member 15. Moreover, the border of the floor panel of the second areas S2, S2 is bound by these area partitioning members.

The third areas S3, S3 are positioned behind the second areas S2, S2 toward the rear of the automobile, and are partitioned by the floor tunnel portion 11, the floor side frames 13 (and protruding portions 14), the No. 2 cross member 15, and the No. 3 cross member 16. Moreover, the border of the floor panels of the third areas S3, S3 is bound by these area partitioning members. The reinforcement members 17 are provided at the third areas S3, S3 toward the outside of the automobile body, and bridge from the floor side frames 13 to the side sills 12, as was mentioned above.

Additionally, two substantially circular rigidity adjustment portions 20, 21 are formed lined up in the lengthwise direction of the automobile body in each floor panel of the areas S1 to S3, and adjust the surface rigidity of the floor panel to make its natural frequency in the 2×1 mode substantially 250 Hz.

The rigidity adjustment portions 20, 21 are both of substantially the same shape and are formed recessing downward as a substantially circular recessed surface in the front and back portions of the floor panel of each area (or as an upward protrusion of a substantially circular convex surface shape). The periphery of the rigidity adjustment portions 20, 21 of the floor panels of each area is formed flat. That is, the rigidity adjustment portions 20, 21 are enclosed by a flat surface, and there is also a flat surface formed between the rigidity adjustment portions 20, 21. It should be noted that topographically uneven lines, which serve to both adjust the surface rigidity and prevent slipping, appear in the rigidity adjustment portions 20, 21 substantially in the shape of a cross.

That is, if recessed portions, for example, are formed in the panels as above in order to increase local rigidity, then as shown in FIG. 6, a deeper depression d tends to increase the local rigidity and increase the natural frequency (resonance frequency), whereas in contrast, a shallow depression d results in a drop in both the local rigidity and the natural frequency. Consequently, by suitably altering the shape of the rigidity adjustment portions 20, 21, it is possible to reliably excite 2×1 mode vibration with respect to the input of vibrations of a specific frequency band. Accordingly, sounds radiated from adjacent, opposite phase portions in the areas cancel each other out (cancellation of radiated sound) and the acoustic radiation efficiency can be made extremely low.

However, in this kind of resonance phenomenon, when the vibration of the floor panel of an area couples with the vibration of the floor panel of another area or the vibration of the area partitioning members (floor tunnel portion 11, floor side frames 13, protruding portions 14, side sills 12, and cross members 7, 8, 15, and 16), the radiated sound becomes insufficiently cancelled and the effect of reducing the radiated sound may be compromised. Consequently, it is preferable that vibration coupling is suppressed.

To induce 2×1 mode vibration, it is preferable that a substantially rectangular panel portion (vibration region), and in particular that a rectangular panel portion in which the width to length side ratio is substantially 1:2, such as a rectangular vibration region in which the width is 150 mm and the length is 300 mm or a rectangular vibration region in which the width is 200 mm and the length is 400 mm, is formed in the floor panel of each of the areas S1 to S3.

Accordingly, a structural bead 22 (rigidity adjustment portion) that extends along the torque box member 7 in the width direction of the automobile at the front side edge portion of the panel, and a structural bead 23 (rigidity adjustment portion) that extends along the No. 2 cross member 15 in the width direction of the automobile at the rear edge portion of the panel, are formed in the floor panels of the first areas S1. Also, the side edges of the floor panels of the first areas S1 in the automobile width direction are bound by the side sill 12 on the exterior side of the automobile and bound by the floor side frame 13 on the interior side of the automobile. In particular, because the protruding portions 14 that protrude upward are provided on the front floor panel 1 on the interior side of the automobile, the surface rigidity in this portion is very significantly altered.

Therefore, the floor panels of the first areas S1 are regulated by the structural beads 22 and 23, the side sills 12 and the floor side frames 13 (and protruding portions 14) so that the region of vibration is substantially rectangular in shape, that is, so that a substantially rectangular panel portion is formed. In this case, the structural beads 22 and 23 function to form the substantially rectangular panel portion in the floor panels of the areas S1, and also function to prevent coupled vibration between these panel portions and the cross members 7 and 15. That is to say, by providing these areas with the structural beads 22 and 23, which extend in the width direction of the automobile, the floor panel of the areas bends easily about the bead portions, which serve as bend lines, and thus is advantageous in preventing coupled vibration.

Moreover, a flat portion (low rigidity portion) of a predetermined width (for example, about 10 mm) is left between the substantially circular rigidity adjustment portions 20 and 21 and the structural beads 22 and 23, the side sills 12, and the floor side frames 13 (protruding portions 14), so that coupled vibration is prevented between the substantially rectangular panel portion and other vibration systems around it and so that the ideal 2×1 mode vibrations can be excited. Put differently, when the substantially circular rigidity adjustment portions 20 and 21 are too close to portions of the substantially rectangular panel portion edge where the rigidity changes discontinuously, the excitation of vibration of a predetermined mode is hindered, however, the existence of the flat portion is beneficial in terms of exciting the ideal 2×1 mode vibrations.

It should be noted that the first areas S1 are provided with an aperture portion 24 for draining water, which has been disposed such that it does not adversely affect the vibration mode of the panels in the S1 areas.

The floor panels of the second areas S2, unlike those of the first areas S1, are formed in a non-rectangular shape in which the width at the front portion of the panel is larger than the width at the back portion of the panel due to the change of the bottom width of the floor tunnel portion 11, which is one of the area partitioning members. Accordingly, a rigidity adjustment portion with a higher surface rigidity than other portions is provided at the front portion of the area on the side to the automobile interior, so as to form a substantially rectangular panel portion (the 2×1 mode vibration region R shown by the two-dash line in FIG. 3) in the non-rectangular floor panel.

More specifically, this rigidity adjustment portion is made of a plurality of beads 25, which are provided having a spacing there between in the lengthwise direction and which extend in the width direction of the automobile such that they span between the side surface of the floor tunnel portion 11 and the floor panel of the areas S2. The portions of the end of the beads 25, on the exterior side of the automobile are arranged in a line (the line on the floor tunnel portion side of the 10 vibration region R shown by the long-short dash line) that extends straight in the area S2 in the length direction of the automobile. This line passes through the bottom portion of the floor tunnel 11 at the rear portion of the area S2.

Consequently, the floor panels of the areas S2 are regulated by the floor side frames 13 (protruding portions 14), the beads 25, and the bottom of the floor tunnel portion 11 to the rear of the group of beads, so that the width of its vibration region R (the dimensions in the width direction of the automobile) is substantially constant across the entire length in the length direction of the automobile.

Also, like the first areas S1, structural beads 22 and 23 extending in the width direction of the automobile along the No. 2 cross member 15 and the No. 3 cross member 16, respectively, are formed at the front and back edge portions of the floor panels of the second areas S2. The structural beads 22 and 23 regulate the length of the vibration region R of the areas S2 and also prevent coupled vibration between the S2 areas and other vibration systems.

Moreover, like the first areas S1, in the second areas S2 there is a flat portion (low rigidity portion) of a predetermined width (for example, about 10 mm) left between the substantially circular rigidity adjustment portions 20 and 21, and the structural beads 22, 23, and 25, the floor tunnel portion 11, and the floor side frames 13 (protruding portions 14).

The floor panels of the third areas S3 are provided with a plurality of beads 25, extending in the width direction of the automobile, in the same way as in the second areas S2, at the boundary portion between it and the floor tunnel portion 11. Also, the side of the floor panels on the exterior of the automobile is securely bound by the floor side frames 13. The front edge portion of the floor panels of the third areas S3 is bound by the No. 2 cross member 15 and made so that its surface rigidity changes discontinuously by a step portion 26 (rigidity altering portion) formed in the front floor panel 1. On the other hand, the rear edge portion is securely bound by the No. 3 cross member 16. Additionally, a flat portion (low rigidity portion) of a predetermined width (for example, about 10 mm) is left in the third areas S3 between the substantially circular rigidity adjustment portions 20, 21 and the boundary portion of the area.

The floor panels of the third areas S3 are disposed below the front seats 18. That is, viewed in the vertical direction of the automobile, the boundary portion of the third areas S3 on at least the front side of the automobile are disposed overlapping with the front seats 18. An aperture 27 is provided in the third areas S3 for the draining of water, and is arranged such that it does not adversely affect the vibration mode of the panels.

With the reduced sound radiation structure for an automobile body floor panel according to this embodiment, the floor panels of the first to third areas S1 to S3 partitioned by the floor tunnel portion 11, the side sills 12, the floor side frames 13, and the cross members 7, 8, 15, and 16 are structured as a vibration mode adjustment panels that have been given a 2×1 mode natural frequency of substantially 250 Hz by adjusting its surface rigidity. Consequently, this significantly diminishes the noise radiated from the front floor panel 1 due to tire cavity resonance and considerably reduces road noise without compromising the reinforcement of the automobile body.

Moreover, the beads 22, 23, and 25 and the step portion 26 are provided at the periphery of the floor panels of the first through third areas S1 to S3 to form substantially rectangular vibration regions and prevent coupled vibration between the areas and other vibration systems. Thus, the desired 2×1 mode vibration can be reliably excited.

Figure 7:
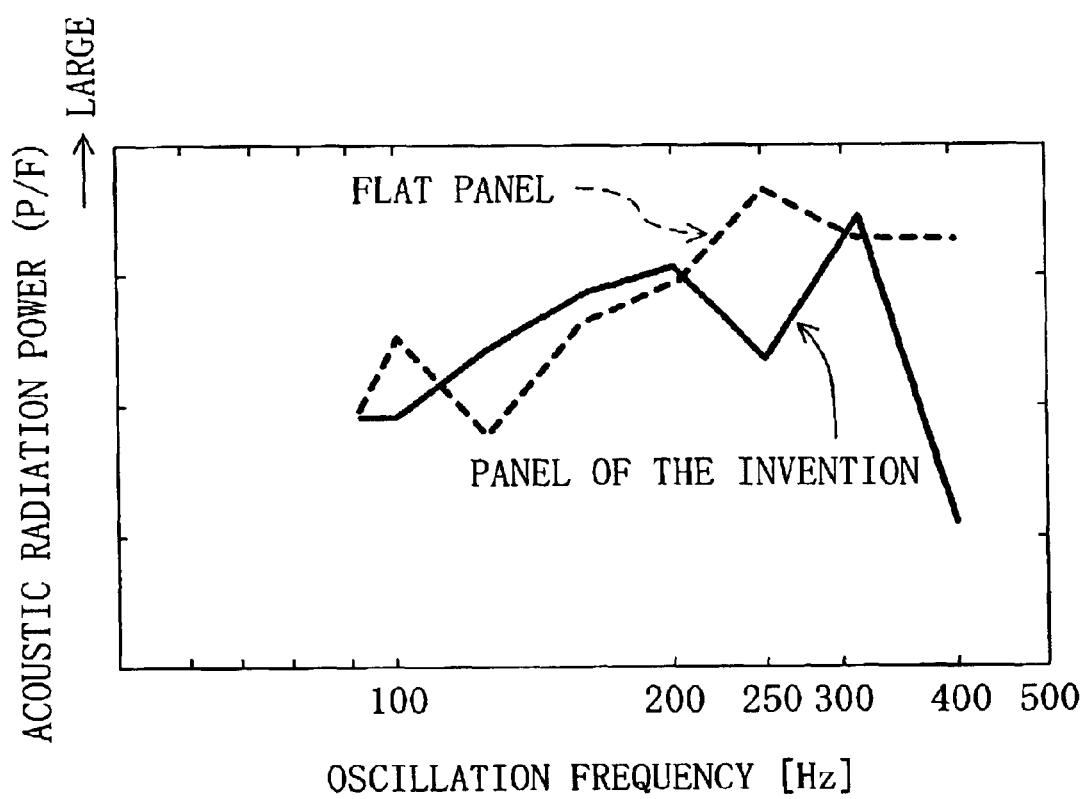
FIG. 7 is a graph comparing the acoustic radiation properties of the panel of Embodiment 1 and a flat panel.

FIG. 7 shows the results of a test comparing the acoustic radiation properties of the panel of the present invention, which has the above vibration mode adjusted floor panel, and a flat panel that is not provided with this vibration mode adjusted floor panel. It should be noted that the panel of the present invention is a panel portion that has been taken from the portion of the front panel 1 enclosed by the broken line A shown in FIG. 3. In the test, the entire circumference of each panel edge was bound simply and an excitation force F was imparted to each panel at a suitable oscillation frequency, in order to measure the acoustic radiation power P.

According to FIG. 7, the panel of the present invention exhibits a large drop over the flat panel in acoustic radiation power at an oscillation frequency of 250 Hz. From these results it can be understood that 2×1 mode vibration occurs near 250 Hz in the vibration mode adjustment area of the panel of the present invention.

Also, the surface rigidity of the floor panels of the fourth areas S4 is adjusted so that the natural frequency of the panels is at least 300 Hz, and therefore resonance with respect to external vibration around 250 Hz caused by tire cavity resonance is avoided and radiated sound is reduced.

That is, according to the present invention, the floor panel is sufficiently reinforced to ensure automobile body rigidity and the ability to protect passengers, while the layout of the reinforced structure is utilized to set the vibration mode adjusted areas S1 to S3 on the floor panel 1 so that a considerable improvement in silence within the automobile interior can be achieved.

Suspension

Figure 8A:
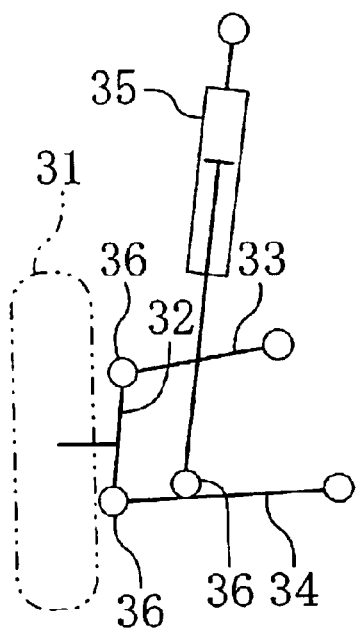
FIGS. 8A and 8B are diagrams of a double wishbone suspension and a strut suspension.

FIG. 8A schematically shows an automobile front suspension according to the present embodiment. This suspension is a double wishbone suspension, in which an upper arm 33 and a lower arm 34 are joined to the top and bottom ends of a knuckle/spindle 32 for a front wheel 31 by ball joints 36, 36, and the lower end of a damper 35 is joined to the lower arm 34 by a ball joint 36. The upper end of the damper 35 is joined to the tire housing of the automobile body.

Figure 8B:
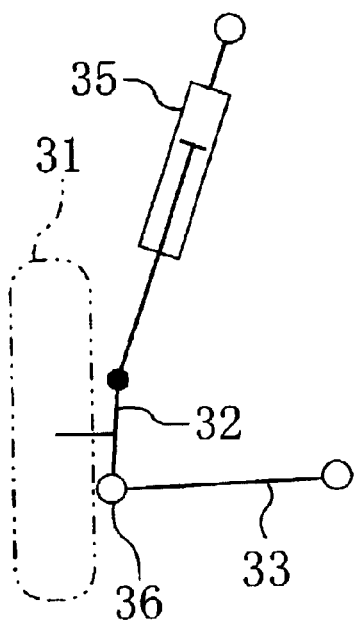

FIG. 8B is a schematic showing a strut suspension to compare with the above double wishbone suspension. A suspension arm 33 is joined to the lower end of the knuckle/spindle 32 for the front wheel 31 by a ball joint 36, and the lower end of the damper 35 is rigidly joined to the upper end of the knuckle/spindle 32 (the joined portion is expressed by the solid black circle). The upper end of the damper 35 is attached to the tire housing of the automobile body.

As is clear from FIGS. 8A and 8B, in the case of the strut suspension the bottom end of the damper 35 is rigidly joined to the knuckle/spindle 32, and thus when the automobile is in motion it is difficult for front to rear and side to side vibration to transmit from the knuckle/spindle 32 to the automobile body via the damper 35. Conversely, in the case of the double wishbone suspension, the bottom end of the damper 35 is joined to the lower arm 34 by the ball joint 36, and thus front to rear and side to side vibration delivered to the damper 35 from the knuckle/spindle 32 via the lower arm 34 is absorbed by the damper 35 vibrating about its upper end attachment to the automobile body, and thus is not easily transmitted to the automobile body.

Therefore, in the present embodiment a double wishbone suspension is adopted for the front suspension. This not only diminished road noise near 160 Hz due to suspension vibration, but is also advantageous in increasing automobile interior silence.

It should be noted that in the vibration mode adjustment areas S1 to S3 that are set in the front floor panel 1, one of the rigidity adjustment portions 20 and 21 that are provided for adjusting the natural frequency of the panel can be concave and the other convex, or both can be concave or convex.

Also, in place of a concave or convex surface, it is possible to provide beads or protruding bars in the areas S1 to S3 in order to adjust the natural frequency of the areas.

Furthermore, it is possible to alter the distribution of the panel surface rigidity not by a concave surface, a convex surface, or structural beads, but by attaching separate members to the panel to locally alter the distribution of its surface density in order to adjust the resonance frequency.

Attaching a damping material to the panel has the effect of controlling other vibration modes and reducing road noise. In this case, the panel vibration level is itself lowered to bring about an overall reduction in the amount of radiated sound, and thus silence within the automobile interior is increased.

In the above embodiment, the floor panels of the first through third areas S1 to S3 are given a vibration mode adjusted floor panel structure, however, there is no limitation to this, and it is also possible to adopt the vibration mode adjusted floor panel structure for only one or any two of the areas S1 to S3. Alternatively, it is possible to adopt the vibration mode adjusted floor panel structure for not only the first to third areas S1 to S3 but also for the fourth area S4.

Also, in the above embodiment, each of the first to third areas S1 to S3 are set to a 2×1 vibration mode with respect to vibration near 250 Hz, which is caused by tire cavity resonance, however, there is no limitation to this, and the floor panel of any of the areas S1 to S3 can also have its natural frequency correspond to another frequency band. For example, the frequency band of the vibration for exciting the 2×1 vibration mode can be set separately for each area, so that the natural frequency in the 2×1 mode of the first and second areas S1 and S2 is near 250 Hz and that the third area S3 corresponds to a separate frequency band.

Also, in this embodiment, the natural frequency of the floor panel that generates 2×1 mode vibration was adjusted to near 250 Hz, however, it can also be adjusted to another frequency band within a range of 200 to 300 Hz. Alternatively, it can also be adjusted to substantially match the tire cavity resonance frequency, which is determined by the automobile speed range at which the automobile is frequently used and the type of tires that the automobile is equipped with.

Embodiment 2

Figure 9:
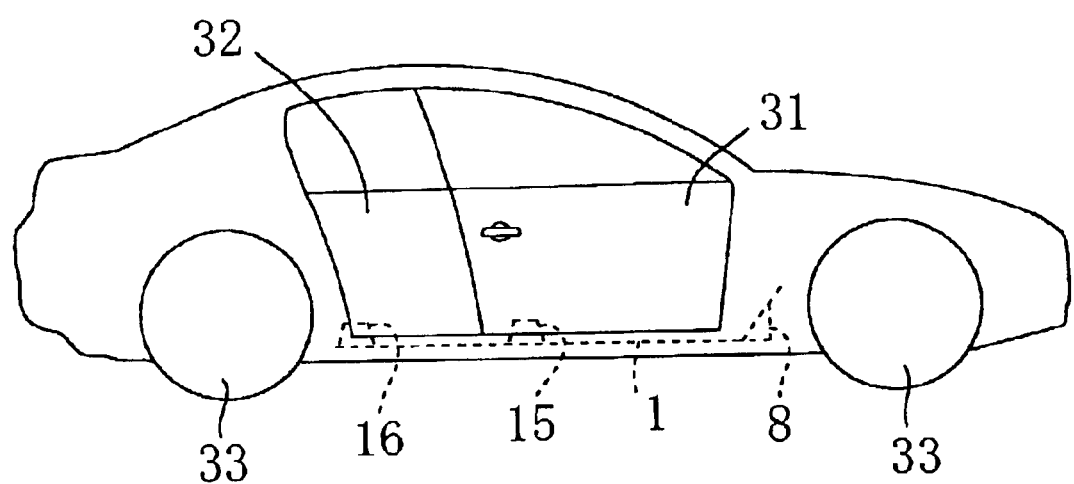
FIG. 9 is a lateral view of an automobile according to Embodiment 2 of the present invention.

FIG. 9 shows an automobile in which the floor panel structure according to Embodiment 2 of the present invention has been adopted. This automobile is a four-door type hinged double door automobile in which the width of the rear doors 32 is less than the width of the front doors 31. This automobile is provided with the No. 1, No. 2, and No. 3 cross members 8, 15, and 16 extending in the width direction of the automobile along the front end, the middle section, and the rear end of the front floor panel 1, respectively. The spacing between the No. 1 cross member 8 and the No. 2 cross member 15 is wider than the spacing between the No. 2 cross member 15 and the No. 3 cross member 16. The numeral 33 denotes the tires.

Figure 10:
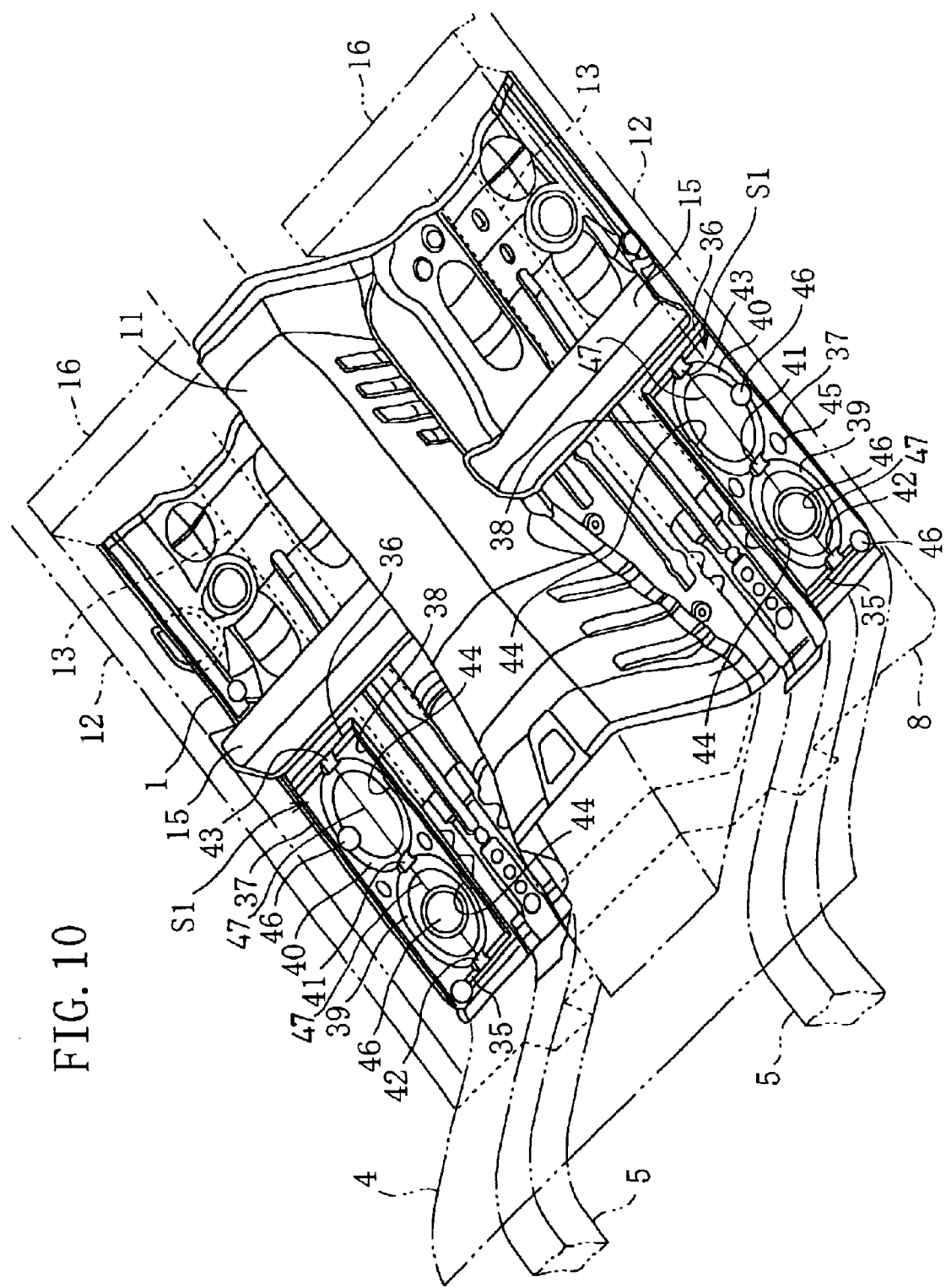
FIG. 10 is a perspective view of the underbody of the automobile according to Embodiment 2.

As shown in FIG. 10, the bottom edge portion of the dash panel 4, which separates the automobile interior from the engine room, is joined to the edge portion of the front floor panel 1 on the front side of the automobile through spot welding, for example, and a pair of front side frames 5, 5, is provided in front of the dash panel 4 such that they enclose the engine room on the left and right.

The front floor panel 1 is a press-formed steel plate of a predetermined thickness (for example, a thickness of 0.65 to 0.7 mm) that, in the substantially central position in the width direction of the automobile, is formed into a single unit with the front tunnel portion 11 that expands upwards and extends in the length direction of the automobile. An automobile side body (not shown) is attached to both ends of the front floor panel 1 in the width direction of the automobile, and the side sills 12, 12 (shown by long-short dashed lines), which have a closed cross section and extend along the bottom edge portion of the side bodies in the lengthwise direction of the automobile body, are joined to the front floor panel 1 by spot welding, for example. That is, the front floor panel 1 is formed by press-forming a single sheet of metal having an overall width of that between the left and right side sills 12, 12 including the floor tunnel portion 11.

Floor side frames 13, 13 are provided between the floor tunnel portion 11 and the side sills 12, 12 and extend in the length direction of the automobile body. Each floor side frame 13, like the rear portion of the front side frames 5, forms a substantially rectangular closed cross section and is made by combining a member, made by a steel plate with a bracket-shaped cross section, to the bottom surface of the front floor panel 1 from below. The front end portions of the floor side frames 13, 13 are connected to the rear end portions of the front side frames 5, 5.

That is, in addition to the centrally located floor tunnel portion 11 and the left and right end side sills 12, 12, the front floor panel 1 is also provided with the floor side frames 13 substantially in the center between the floor tunnel portion 11 and the side sills 12, to serve as reinforcement in the length direction of the automobile body. Thus, sufficient bending rigidity and twisting rigidity of the automobile body is ensured while deformations of the automobile interior due particularly to head-on automobile collisions are minimized, in order to reliably protect the passengers.

On the other hand, to serve as reinforcement in the width direction of the automobile, there is the previously mentioned No. 1 cross member 8 for reinforcing the front end portion of the front floor panel 1. In addition to this, a No. 2 cross member 15 that extends in the width direction of the automobile in the central position of the length direction of the front floor panel 1, and a No. 3 cross member 16 that extends in the automobile width direction at the rear end portion of the front floor panel 1 are provided.

The No. 1 cross member 8 is provided spanning from the front edge of the floor panel 1 to the dash panel 4, and together the cross member 8 and the dash panel 4 configure a closed cross section structure that extends in the width direction of the automobile.

The No. 2 cross member 15 and the No. 3 cross member 16 are members that have a bracket-shaped cross section that opens downward and have been joined to the top surface of the front floor panel 1, and are joined to the floor tunnel portion 11 at their end in the substantially central position in the width direction of the automobile and are joined to the side sills 12 at their lateral end portions.

With the above configuration, the floor provided by the front floor panel 1 is partitioned into eight areas, each of a substantially rectangular or near rectangular shape, by the floor tunnel portion 11, the floor side frames 13, 13, and the side sills 12, 12, which extend in the length direction of the automobile, and the cross members 8, 15, and 16, which extend in the width direction of the automobile.

Moreover, this embodiment is characterized in that the floor panels of two areas S1 of these eight areas, which have been partitioned on the left and right by the side sills 12 and the side frames 13 and to their front and rear by the No. 1 and No. 2 cross members 8 and 15, are structured as vibration mode adjusted floor panels that excite a specific vibration mode of a low acoustic radiation efficiency with respect to vibrations input in a predetermined frequency band (200 to 300 Hz), which corresponds to the cavity resonance frequency of the tires, and in particular to vibrations input at 220 to 240 Hz. The rigidity of the floor panels of the remaining areas of the eight areas is adjusted so that the natural frequency of the panels is higher than 300 Hz.

Also, in this embodiment, as was mentioned before, the rigidity of the automobile body is ensured by effectively utilizing the layout of the reinforcement structure, such as the frames and cross members that are disposed in the length direction of the automobile and in the width direction of the automobile, respectively, and the floor panels of the areas S1, which are oblong in the automobile lengthwise direction, on the front floor panel 1 are configured to excite 2×1 mode vibration, in which stationary waves in the lengthwise direction have two antinodes and stationary waves in the width direction have one antinode.

More specifically, the floor panels of the areas S1, which are partitioned by the side sills 12, the side frames 13, and the cross members 8 and 15, are oblong rectangles in which the length of the long sides extending in the length direction of the automobile is more than twice the length of the short sides (in this embodiment, the ratio of the long edge to the short edge is approximately 3). Moreover, the border of the floor panels of the areas S1 is bound by the side sills 12, the side frames 13, and the cross members 8 and 15.

Also, the floor panels of the areas S1 are provided with rigidity adjustment means to adjust the rigidity of the floor panels, so that they vibrate in the 2×1 mode and that their natural frequency is substantially 230 Hz.

First, horizontal beads 35 and 36 that extend in the width direction of the automobile are formed at the front and rear end portions of the floor panels, and longitudinal beads 37 and 38 that extend in the length direction of the automobile are provided on the left and right sides of the floor panels. The ratio of the length of the long side of the rectangular surface that is enclosed by the horizontal and longitudinal beads 35 to 38 to its short side is slightly less than three.

A pair of elliptical curved surface portions (saucer-shaped recessions) 39 and 40, the perimeter of which is formed in an elliptical shape that is oblong in the length direction of the automobile, and which protrude downward, are provided in the surface enclosed by the beads 35 to 38 and are lined up in the length-direction of the automobile with mutually coincident long axes. The perimeter of the elliptical curved surface portions 39 and 40 is basically formed flat.

An intermediate bead 41 is formed between the pair of elliptical curved surface portions 39 and 40, end portion beads 42 and 43 are respectively formed at the front end edge of the front elliptical curved surface portion 39 and at the rear end edge of the rear elliptical curved surface portion 40, and lateral portion beads 44, 44 are formed at the edge of the elliptical curved surface portions 39 and 40 on their side frame 13 side. Moreover, recessed portions 45 are formed in the flat portion on both sides of the intermediate beads 41. The numeral 46 denotes an aperture for draining water.

Both the horizontal beads 35 and 36 and the lengthwise beads 37 and 38 are structural beads that are formed as groove-shaped depressions in the panel.

Figure 11:
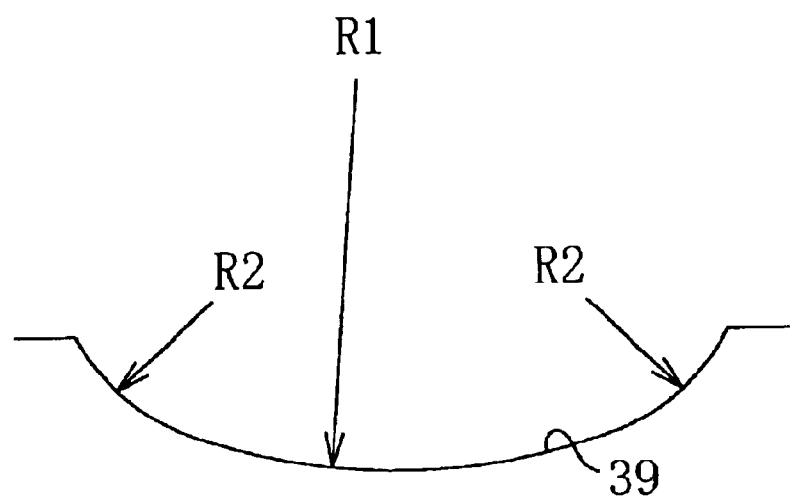
FIG. 11 is a diagram showing the compound curved surface of the elliptical curved surface portions according to Embodiment 2.

The size of the ellipse of the elliptical curved surface portions 39 and 40 is adjusted so as to establish a relationship where the recessed portions are in contact when viewed from above, that is, the end of their long axes are in contact with one another. Also, as shown in FIG. 11, the elliptical curved surface portions 39 and 40 are formed as a compound curved surface in which the curved surface of the central portion, which has a large radius of curvature R1, and the curved surface of the perimeter portion, which has a small radius of curvature R2, are connected. In the case of this embodiment, the radius of curvature R1 is four times the radius of curvature R2. Also, beads 47 that both adjust the surface rigidity and act as a non-slip member are provided at the elliptical curved surface portions 39 and 40 and extend in the length direction of the automobile.

Figure 12:
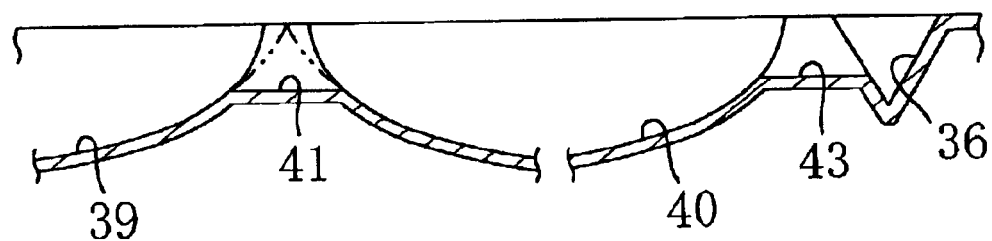
FIG. 12 is a cross-sectional view taken in the lengthwise direction of the automobile, and shows the intermediate beads and the end portion beads according to Embodiment 2.

The intermediate beads 41 are structural beads that are formed recessed in a groove-shape between the elliptical curved surface portions 39 and 40, extend in the length direction of the automobile at a narrower width than the short axis of the ellipse of the elliptical curved surface portions 39 and 40, and as shown in FIG. 12, link the ends of the long axes of the elliptical curved surface portions 39 and 40.

The rear end portion beads 43 are structural beads that are formed recessed in a groove-shape at the rear end of the long axis of the rear side elliptical curved surface portion 40, extend in the length direction of the automobile at the same width as the intermediate beads 41, and link the rear elliptical curved surface portions 40 and the rear horizontal structural beads 36. The front end portion beads 42 are formed in the same way as the rear end portion beads 43, and link the front elliptical curved surface portions 39 and the front horizontal structural beads 35.

Figure 13:
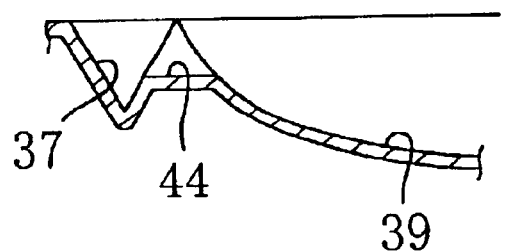
FIG. 13 is a cross-sectional view taken in the width direction of the automobile, and shows the lateral beads according to Embodiment 2.

The lateral portion beads 44 are structural beads that are formed as groove-shaped recessions on the edge of the elliptical curved surface portions 39 (40) on the side of the side frames 13 (the position of the short axis of the ellipse of the elliptical curved surface portions), and as shown in FIG. 13, extend in the length direction of the automobile spanning between the elliptical curved surface portions 39 (40) and the lengthwise structural beads 37. It should be noted that the lateral beads are not provided on the side sill 12 side of the elliptical curved surface portions 39 (40). The reason for this is that the side sills 12 are more rigid than the side frames 13 and more tightly bind the floor panels. That is, considering the difference in rigidity between the side sills 12 and the side frames 13, the reason why the lateral portion beads 44 have been provided only on the side of the narrow frames 13 is to balance the rigidity of both sides of the elliptical curved surface portions 39 and 40 so that the elliptical curved surface portions 39 and 40 vibrate vertically in an orderly fashion without distortion, so that the central portion between the elliptical curved surface portions 39 and 40 becomes an antinode.

By adjusting the surface rigidity as above, the floor panels of the areas S1 vibrate in the 2×1 mode and have a natural frequency of approximately 230 Hz. The following is a specific description of the operation of the above-described rigidity adjustment means, such as the elliptical curved surface portions 39 and 40, based on the results of a simulation.

Figure 14A:
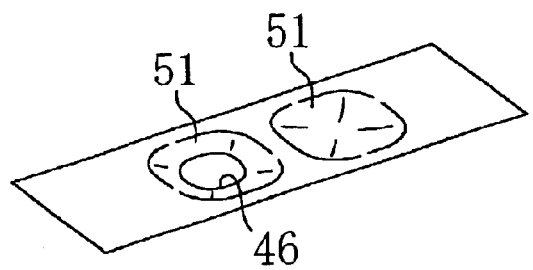
FIGS. 14A–14F are perspective views showing various types of floor panels.

In the case of FIG. 14A, a pair of curved surface portions 51, 51 with a square perimeter are formed in a line in the length direction in the central portion of the floor panels of the areas S1, and the outside of the curved surface portions 51, 51 in the length direction is flat. The natural frequency in this case is approximately 135 Hz in the 1×1 mode and approximately 156 Hz or approximately 242 Hz in the 2×1 mode. However, although the natural frequency in the 2×1 mode appeared at approximately 242 Hz, the vibration of the panel did not become a clear 2×1 mode vibration.

Figure 14B:
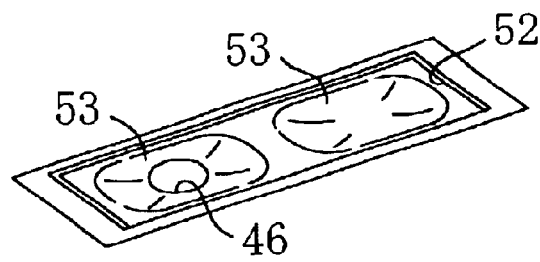

In the case of FIG. 14B, a groove-shaped structural bead 52 is formed along the perimeter of the floor panels of the areas S1, and a pair of rectangular, curved surface portions 53, 53 that are oblong in the length direction are formed in a line in the length direction in the surface enclosed by the structural bead 52. The natural frequency in this case is approximately 90 Hz in the 1×1 mode and approximately 138 Hz in the 2×1 mode. However, this is very low considering that the target natural frequency in the 2×1 mode is the tire cavity resonance frequency of 230 Hz.

Figure 14C:
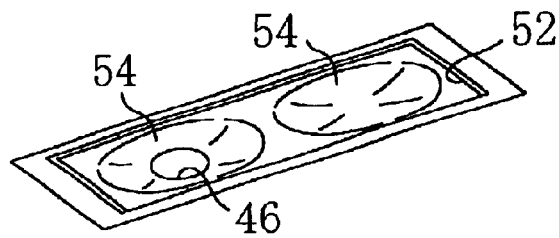

In the case of FIG. 14C, the rectangular curved surface portions 53 of FIG. 14B have been replaced with elliptical curved surface portions 54 that are oblong in the length direction. The elliptical curved surface portions 54 are formed in a curved surface that has the same radius of curvature at its central portion as at its edge portion (the radius of curvature in the width direction is approximately 450 mm). The natural frequency in this case is approximately 90 Hz in the 1×1 mode and approximately 148 Hz in the 2×1 mode. In other words, it was found that providing elliptical curved surface portions increased the natural frequency in the 2×1 mode, but considering that the target frequency is the tire cavity resonance frequency of 230 Hz, the frequency is still too low.

Figure 14D:
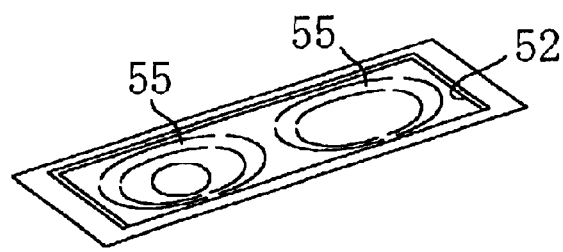

In the case of FIG. 14D, elliptical curved surface portions 55 of a compound curved surface in which the curved surface of the central portion, which has a large radius of curvature R1, and the curved surface of the peripheral portion, which has a small radius of curvature R2, are connected as shown in FIG. 11 (R1=600 mm, R2=150 mm), have been adopted in place of the elliptical curved surface portions 54 of FIG. 14C, which have a constant radius of curvature. The natural frequency in this case is approximately 98 Hz in the 1×1 mode and approximately 160 Hz in the 2×1 mode. That is, it was found that the natural frequency in the 2×1 mode is increased by forming the elliptical curved surface portions in a compound curved surface, but considering that the target frequency is the tire cavity resonance frequency of 230 Hz, the frequency is still too low.

Figure 14E:
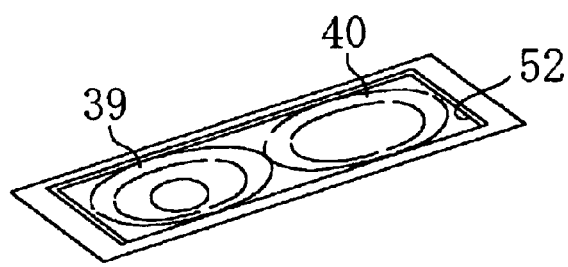

In the case of FIG. 14E, the elliptical curved surface portions 39 and 40, which are provided by deepening the elliptical curved surface portions 55 with the compound curved surface of FIG. 14D so as to increase their size, are adopted, and the ends of the long axis of the adjacent elliptical curved surface portions 39 and 40 are in contact with one another. The natural frequency in this case is approximately 138 Hz in the 1×1 mode and approximately 194 Hz in the 2×1 mode. That is, it was found that the natural frequency in the 2×1 mode is increased by providing larger elliptical curved surface portions, but considering that the target frequency is the tire cavity resonance frequency of 230 Hz, the frequency is still too low. Also, from an analysis of the distortion in energy distribution when the elliptical curved surface portions 39 and 40 are vibrated, it was found that there is large distortion at the site where the ends of the long axis of the elliptical curved surface portions 39 and 40 are in contact with one another, the front end portion of the elliptical curved surface portion 39, the rear end portion of the elliptical curved surface portion 40, and one side (the side frame side) of the elliptical curved surface portions 39 and 40.

Figure 14F:
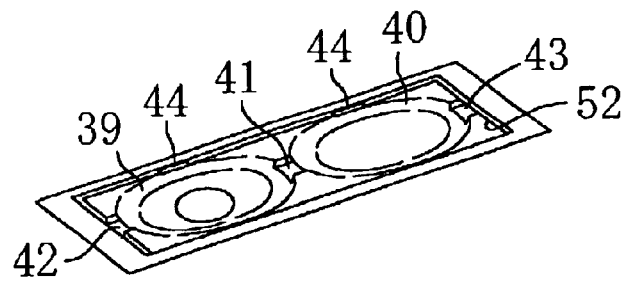

In the case of FIG. 14F, intermediate structural beads 41 linking the elliptical curved surface portions 39 and 40, end portion structural beads 42 and 43 linking the elliptical curved surface portions 39 and 40 and the structural beads 52, 52 at the front and the rear thereof, and lateral portion structural beads 44 were provided to the case of FIG. 14E (the embodiment shown in FIG. 10). That is, the structural beads 41 to 44 were formed at the sites where there was a large distortion during vibration. The depth of the structural beads 41 to 44 was set at 3 mm. The natural frequency in this case was approximately 157 Hz in the 1×1 mode and approximately 234 Hz in the 2×1 mode. That is, by forming the above structural beads 41 to 44, it was possible to substantially match the natural frequency of the 2×1 mode to the target frequency of 230 Hz, which is the tire cavity resonance frequency.

In the case of an oblong floor panel that is oblong in the length direction, however, there is lower bending rigidity in the length direction than in the width direction. With respect to this, the above-mentioned elliptical curved surface portions 39 and 40 extend long in the length direction and the structural beads 41 to 44 are all oblong in the length direction, so that both of these increase the bending rigidity of the floor panel in the length direction. It seems that this works in favor of increasing the natural frequency in the 2×1 mode to substantially match the tire cavity resonance frequency of 230 Hz.

Also, as is clear from comparing the natural frequencies in FIG. 14E and FIG. 14F, a major function of the structural beads 41 to 44 is to increase the natural frequency of the panel, and the depth of the structural beads significantly affects this function. Therefore, by forming the groove-shaped structural beads 41 to 44 and adjusting the depth thereof after the basic shape of the floor panel for the 2×1 mode vibration has been determined (the peripheral beads 35 to 38 (or 52) and the pair of elliptical curved surface portions 39 and 40), the natural frequency of the panel in the 2×1 mode can be easily tuned to substantially match the tire cavity resonance frequency.

The peripheral structural beads 35 to 38 function not only to restrict the region in the substantially rectangular floor panel where vibration in the 2×1 mode is generated and increase the overall rigidity of the floor panel, but also function to prevent coupled vibration between the 2×1 mode vibration region and the reinforcing members that are peripheral thereto, such as the side frames and the cross members. That is, the structural beads 35 to 38 increase the bending rigidity of the floor panel in their lengthwise direction but do not increase its bending rigidity in the direction perpendicular to their lengthwise direction, and thus inhibit the transfer of vibration between the 2×1 mode vibration region and the reinforcing members that are peripheral thereto. The flat portions around the elliptical curved surface portions 39 and 40 also work to prevent coupled vibration.

Figure 15:
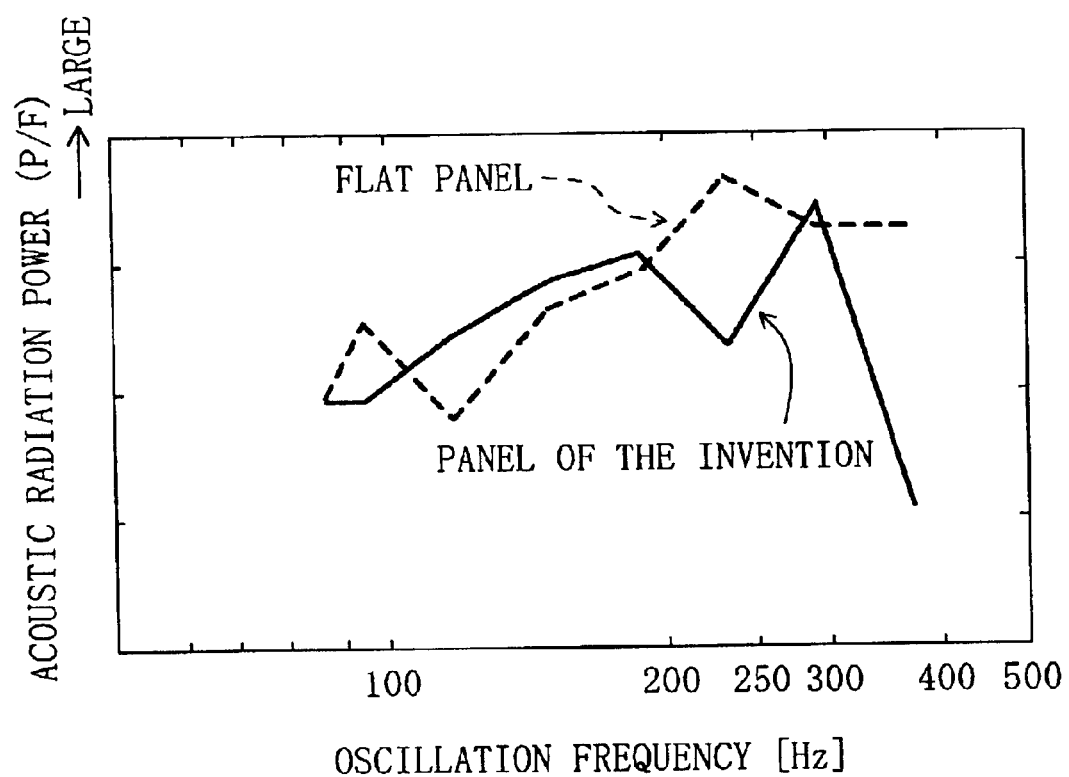
FIG. 15 is a graph comparing the acoustic radiation properties of the panel according to Embodiment 2 with those of a flat panel.

FIG. 15 shows the results of a test comparing the acoustic radiation properties of the panel of the present invention, which has the above vibration mode adjusted floor panel, with those of a flat panel, which has not been provided with such a vibration mode adjusted floor panel. In the test, the entire circumference of each panel edge was bound simply and an excitation force F was imparted to each panel at a suitable oscillation frequency in order to measure the acoustic radiation power P.

According to FIG. 15, the panel of the present invention exhibits a large drop over the flat panel in acoustic radiation power at an oscillation frequency of 230 Hz. From these results, it can be understood that 2×1 mode vibration occurs near 230 Hz in the vibration mode adjustment area of the panel of the present invention.

The rigidity of the floor panels of areas other than the areas S1 was adjusted so that the natural frequency was at least 300 Hz, and therefore the panels avoid resonating with respect to external vibration near 230 Hz due to tire cavity resonance, and a reduction in radiated sound is achieved.

It should be noted that the configuration of this invention is not limited to these embodiments, and may also encompasses various other configurations. For example, one of the pair of elliptical curved surface portions 39 and 40 can be given a concave curved surface that protrudes downward and the other given a convex curved surface that protrudes upwards, or both may be given a convex curved surface.

Attaching a damping material to the panel has the effect of controlling other vibration modes and reducing road noise. In this case, the panel vibration level is itself lowered to bring about an overall reduction in the amount of radiated sound, and thus silence within the automobile interior is increased.

In the above embodiments, the floor panels of the first areas S1 are given a vibration mode adjusted floor panel structure, however, there is no limitation to this, and it is also possible to suitably adopt the vibration mode adjusted floor panel structure for the other areas as well.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and cross members extending in the automobile width direction, wherein a floor panel of at least one area of the plurality of areas is bound at its perimeter by one of the side frames, two cross members and the floor tunnel portion or one of the side sills, and the floor panel is non rectangular in shape and has a floor panel structure in which a vibration mode is adjusted, wherein a rigidity adjustment portion with a higher surface rigidity than other portions is provided at a periphery of the non-rectangular floor panel, so that a substantially rectangular portion, which generates a stationary wave vibration a 2×1 mode resulting in two antinodes in the lengthwise direction of the automobile body and one antinode in the automobile width direction, is formed in the non-rectangular floor panel, and wherein the rigidity of the substantially rectangular portion is partially increased such that a natural frequency of the 2×1 mode is substantially matched to a tire cavity resonance frequency of the automobile.

2. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and cross members extending in the automobile width direction, wherein a floor panel of at least one area of the plurality of areas is bound at its perimeter by one of the side frames, two cross members and the floor tunnel portion or one of the side sills, and the floor panel has a floor panel structure in which a vibration mode is adjusted, wherein a rigidity adjustment portion for regulating the region of vibration of the panel is provided, such that a substantially rectangular portion, which generates a stationary wave vibration of a 2×1 mode resulting in two antinodes in the lengthwise direction of the automobile body and one antinode in the automobile width direction, and of which a ratio of a width side to a length side is substantially 1:2, is formed, and wherein the rigidity of the substantially rectangular portion is partially increased such that a natural frequency of the 2×1 mode is substantially matched to a tire cavity resonance frequency of the automobile.

3. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and cross members extending in the automobile width direction, wherein a floor panel of at least one area of the plurality of areas is bound at its perimeter by one of the side frames, two cross members and the floor tunnel portion or one of the side sills, and the floor panel has a floor panel structure in which a vibration mode is adjusted, wherein a substantially rectangular portion of which rigidity is partially increased is provided, such that a vibration of a 2×1 mode resulting in two antinodes in the lengthwise direction of the automobile body and one antinode in the automobile width direction is generated and a natural frequency of the 2×1 mode is substantially matched to a tire cavity resonance frequency of the automobile, and wherein a rigidity adjustment portion that suppresses coupled vibration between the substantially rectangular panel portion and at least one of the floor tunnel portion, the side sills, the side frames, and the cross members is provided at a periphery portion of the vibration mode adjusted floor panel.

4. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and cross members extending in the automobile width direction, wherein a floor panel of at least one area of the plurality of areas is bound at its perimeter by one of the side frames, two cross members and the floor tunnel portion or one of the side sills, and the floor panel is non rectangular in shape and has a floor panel structure in which a vibration mode is adjusted, wherein a rigidity adjustment portion with a higher surface rigidity than other portions is provided at a periphery of the non-rectangular floor panel, so that a substantially rectangular portion, which generates a stationary wave vibration of a 2×1 mode resulting in two antinodes in the lengthwise direction of the automobile body and one antinode in the automobile width direction, is formed in the non-rectangular floor panel, and wherein the rigidity of the substantially rectangular portion is partially increased such that a natural frequency of the 2×1 mode is 200 to 300 Hz.

5. The automobile floor structure according to claim 4, wherein the vibration mode adjusted floor panel is adjusted so that its rigidity is partially increased and a stationary wave vibration of the 2×1 mode occurs at 240 to 260 Hz.

6. An automobile floor structure, wherein the automobile floor is partitioned into a plurality of areas by a floor tunnel portion extending in the lengthwise direction of the automobile body along a central portion in the automobile width, left and portions of the automobile width, side frames extending between the floor tunnel portion and the left and right side sills in the lengthwise direction of the automobile body, and cross members extending in the automobile width direction, wherein a floor panel of at least one area of the plurality of areas is bound at its perimeter by one of the side frames, two cross members and the floor tunnel portion or one of the side sills, and has a floor panel structure in which a vibration mode is adjusted, wherein a rigidity adjustment portion for regulating the region of vibration of the floor panel is provided, such that a substantially rectangular portion, which generates a stationary wave vibration of a 2×1 mode resulting in two antinodes in the lengthwise direction of the automobile body and one antinode in the automobile width direction, and of which a ratio of a width side to a length side is substantially 1:2, is formed, and wherein the rigidity of the substantially rectangular portion is partially in increased such that a natural frequency of the 2×1 mode is 200 to 300 Hz.

7. The automobile floor structure according to either one of claim 1, 2, 4 or 6, wherein the floor panel is formed by press-forming a single metal sheet having a total width of that between the left and right side sills including the floor tunnel portion, and wherein the rigidity adjustment portion is formed on the panel as a structural bead that extends in the automobile width direction.

8. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and cross members extending in the automobile width direction, wherein a floor panel of at least one area of the plurality of areas is bound at its perimeter by one of the side frames, two cross members and the floor tunnel portion or one of the side sills, and the floor panel has a floor panel structure in which a vibration mode is adjusted, wherein rigidity is partially increased, such that a stationary wave vibration of a 2×1 mode resulting in two antinodes in the lengthwise direction of the automobile body and one antinode in the automobile width direction is generated and a natural frequency of the 2×1 mode is substantially matched to a tire cavity resonance frequency of the automobile, and wherein in at least an area of the plurality of areas other than those areas in which the floor panel has the vibration mode adjusted floor panel structure, the rigidity of the floor panel is adjusted so that its natural frequency is more than 300 Hz.

9. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and a plurality of cross members extending in the automobile width direction, a floor panel of at least one area of the plurality of areas is bound at its left and right by one of the side frames and either the floor tunnel portion or one of the side sills, formed in a substantially rectangular shape that is bound at its front and back by two cross members and oblong in the lengthwise direction of the automobile body, and has long sides that are formed more than twice as long as its short sides, the floor panel is provided with a pair of curved surface portions that are formed in an elliptical shape with a perimeter that is oblong in the lengthwise direction of the automobile body, that protrude upwards or downwards, and that are lined up in the lengthwise direction of the automobile body with coinciding long axes, and the floor panel has a floor panel structure in which a vibration mode is adjusted such that a 2×1mode vibration resulting in two antinodes in the lengthwise direction of the automobile body and one antinode in the automobile width direction is generated and a natural frequency of the 2×1 mode is substantially matched to a tire cavity resonance frequency of the automobile wherein each of the pair of elliptical curved surface portions has a first radius of curvature at its central portion and a second radius of curvature at its periphery portion, the first radius being larger than the second radius.

10. The automobile floor structure according to claim 9, wherein the automobile is a two-door type automobile or a four-door type hinged double door automobile in which the back doors are more narrow than the front doors.

11. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and a plurality of cross members extending in the automobile width direction, a floor panel of at least one area of the plurality of areas is bound at its left and right by one of the side frames and either the floor tunnel portion or one of the side sills, formed in a substantially rectangular shape that is bound at its front and back by two cross members and oblong in the lengthwise direction of the automobile body, and has long sides that are formed more than twice as long as its short sides, the floor panel is provided with a pair of curved surface portions that are formed in an elliptical shape with a perimeter that is oblong in the lengthwise direction of the automobile body, that protrude upwards or downwards, and that are lined up in the lengthwise direction of the automobile body with coinciding long axes, and the floor panel has a floor panel structure in which a vibration mode is adjusted such that a 2×1 mode vibration resulting in two antinodes in the lengthwise direction of the automobile body and one antinode in the automobile width direction is generated and a natural frequency of the 2×1 mode is 200 to 300 Hz, and wherein each of the pair of elliptical curved surface portions has a first radius of curvature at its central portion and a small second radius of curvature at its periphery portion, the first radius being larger than the second radius.

12. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and a plurality of cross members extending in the automobile width direction, a floor panel of at least one area of the plurality of areas is bound at its left and right by one of the side frames and either the floor tunnel portion or one of the side sills, formed in a substantially rectangular shape that is bound at its front and back by two cross members and oblong in the lengthwise direction of the automobile body, and has long sides that are formed more than twice as long as its short sides, the floor panel is provided with a pair of curved surface portions that are formed in an elliptical shape with a perimeter that is oblong in the lengthwise direction of the automobile body, that protrude upwards or downwards, and that are lined up in the lengthwise direction of the automobile body with coinciding long axes, and the floor panel has floor panel structure in which a vibration mode is adjusted such that a 2×1 mode vibration resulting in two antinodes in the lengthwise direction of the automobile body and one antinode in the automobile width direction is generated and a natural frequency of the 2×1 mode is substantially matched to a tire cavity resonance frequency of the automobile, and wherein the pair of elliptical curved surface portions, when viewed from above, are in contact with each other or overlapping.

13. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and a plurality of cross members extending in the automobile width direction, a floor panel of at least one area of the plurality of areas is bound at its left and right by one of the side frames and either the floor tunnel portion or one of the side sills, formed in a substantially rectangular shape that is bound at its front and back by two cross members and oblong in the lengthwise direction of the automobile body, and has long sides that are formed more than twice as long as its short sides, the floor panel is provided with a pair of curved surface portions that are armed in an elliptical shape with a perimeter that is oblong in the lengthwise direction of the automobile body, that protrude upwards or downwards, and that are lined up in the lengthwise direction of the automobile body with coinciding long axes, and the floor panel has a floor panel structure in which a vibration mode is adjusted such that a 2×1 mode vibration resulting in two antinodes in the lengthwise direction of the automobile body and one antinode in the automobile width direction is generated and a natural frequency of the 2×1 mode is substantially matched to a tire cavity resonance frequency of the automobile, and wherein an intermediate bead that extends in the lengthwise direction of the automobile body and that is narrower in width than the short axis of the ellipse is formed in the floor panel, so as to link end portions of the long axes of the pair of elliptical curved surface portions to each other.

14. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, an a plurality of cross members extending in the automobile width direction, a floor panel of at least one area of the plurality of areas is bound at its left and right by one of the side frames and either the floor tunnel portion or one of the side sills, formed in a substantially rectangular shape that is bound at its front and back by two cross members and oblong in the lengthwise direction of the automobile body, and has long sides that are formed more than twice as long as its short sides, the floor panel is provided with a pair of curved surface portions that are formed in an elliptical shape with a perimeter that is oblong in the lengthwise direction of the automobile body, that protrude upwards or downwards, and that are lined up in the lengthwise direction of the automobile body with coinciding long axes, and the floor panel has a floor panel structure in which a vibration mode is adjusted such that a 2×1 mode vibration resulting in two antinodes in the lengthwise direction of the automobile body and one antinode in the automobile width direction is generated and a natural frequency of the 2×1 mode is 200 to 300 Hz, and wherein an intermediate bead that extends in the lengthwise direction of the automobile body and that is narrower in width than the short axis of the ellipse is formed in the floor panel, so as to link end portions of the long axes of the pair of elliptical curved surface portions to each other.

15. The automobile floor structure according to claim 13 or claim 14, wherein end portion beads extending in the lengthwise direction of the automobile body are formed in the floor panel at the end of each elliptical curved surface portion in the direction of the long axis on the side opposite the intermediate bead.

16. The automobile floor structure according to claim 13 or claim 14, wherein lateral portion beads extending in the lengthwise direction of the automobile body are formed in the floor panel at the side edge of each elliptical curved surface portion.

17. The automobile floor structure according to claim 16, wherein the floor panel is bound on its left and right by one of the side frames and one of the side sills, and the lateral portion beads are disposed not on the side of the side sills but the side of the side frames, which have a low degree of binding with respect to the floor panel, so that the rigidity of both sides of the elliptical curved surface portions is balanced.

18. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and a plurality of cross members extending in the automobile width direction, a floor panel of at least one area of the plurality of areas is bound at its left and right by one of the side frames and either the floor tunnel portion or one of the side sills, formed in a substantially rectangular shape that is bound at its front and back by two cross members and oblong in the lengthwise direction of the automobile body, and has long sides that are formed more than twice as long as its short sides, the floor panel is provided with a pair of curved surface portions that are formed in an elliptical shape with a perimeter that is oblong in the lengthwise direction of the automobile body, that protrude upwards or downwards, and that are lined up in the lengthwise direction of the automobile body with coinciding long axes, and the floor panel has a floor panel structure in which a vibration mode is adjusted such that a 2×1 mode vibration resulting in two antinodes in the lengthwise direction of the automobile body and one antinode in the automobile width direction is generated and a natural frequency of the 2×1 mode is substantially matched to a tire cavity resonance frequency of the automobile, and wherein a rigidity adjustment means, which functions to increase a bending rigidity of the floor panel in the lengthwise direction of the automobile body more than a bending rigidity of the panel in the width direction of the automobile body, is provided in the floor panel.

19. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and cross members extending in the automobile width direction, wherein a floor panel of at least one area of the plurality of areas is bound at its perimeter by one of the side frames, two cross members and the floor tunnel portion or one of the side sills, and has a floor panel structure in which a vibration mode is adjusted, wherein a substantially rectangular portion of which rigidity is partially increased is provided such that a 2×1 mode vibration resulting in two antinodes in the lengthwise direction of the automobile body and one antinode in the automobile width direction is generated and a natural frequency of the 2×1 mode is 200 to 300 Hz, and wherein a rigidity adjustment portion that suppresses coupled vibration between the substantially rectangular panel portion and at least one of the floor tunnel portion, the side sills, the side frames, and the cross members is provided at a periphery portion of the vibration mode adjusted floor panel.

20. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and cross members extending in the automobile width direction, wherein a floor panel of at least one area of the plurality of areas is bound at its perimeter by one of the side frames, two cross members and the floor tunnel portion or one of the side sills, and has a floor panel structure in which a vibration mode is adjusted, wherein a rigidity is partially increased such that a stationary wave vibration of 2×1 mode resulting in two antinodes in the lengthwise direction of the automobile body and one antinode in the automobile width direction is generated and a natural frequency of the 2×1 mode is 200 to 300 Hz, and wherein in at least an area of the plurality of areas other than those areas in which the floor panel has the vibration mode adjusted floor panel structure, the rigidity of the floor panel is adjusted so that its natural frequency is more than 300 Hz.

21. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and a plurality of cross members extending in the automobile width direction, a floor panel of at least one area of the plurality of areas is bound at its left and right by one of the side frames and either the floor tunnel portion or one of the side sills, formed in a substantially rectangular shape that is bound at its front and back by two cross members and oblong in the lengthwise direction of the automobile body, and has long sides that are formed more than twice as long as its short sides, the floor panel is provided with a pair of curved surface portions that are formed in an elliptical shape with a perimeter that is oblong in the lengthwise direction of the automobile body, that protrude upwards or downwards, and that are lined up in the lengthwise direction of the automobile body with coinciding long axes, and the floor panel has a floor panel structure in which a vibration mode is adjusted such that a 2×1 mode vibration resulting in two antinodes in the lengthwise direction of the automobile body and one antinode in the automobile width direction is generated and a natural frequency of the 2×1 mode is 200 to 300 Hz, and wherein the pair of elliptical curved surface portions, when viewed from above, are in contact with each other or overlapping.

22. An automobile floor structure, wherein the automobile floor is partitioned into a plurality of areas by a floor tunnel portion extending in the lengthwise direction of the automobile body along a central portion in the automobile width, left and right side sills extending in the lengthwise direction of the automobile body along both side portions of the automobile width, side frames extending between the floor tunnel portion and the left and right side sills in the lengthwise direction of the automobile body, and a plurality of cross members extending in the automobile width direction, a floor panel of at least one area of the plurality of areas is bound at its left and right by one of the side frames and either the floor tunnel portion or one of the side sills, formed in a substantially rectangular shape that is bound at its front and back by two cross members and oblong in the lengthwise direction of the automobile body, and has long sides that are formed more than twice as long as its short sides, the floor panel is provided with a pair of curved surface portions that are formed in an elliptical shape with a perimeter that is oblong in the lengthwise direction of the automobile body, that protrude upwards or downwards, and that are lined up in the lengthwise direction of the automobile body with coinciding long axes, and the floor panel has floor panel structure in which a vibration mode is adjusted such that a 2×1 mode vibration resulting in two antinodes in the lengthwise direction of the automobile body and one antinode in the automobile width direction is generated and a natural frequency of the 2×1 mode is 200 to 300 Hz, and wherein a rigidity adjustment means, which functions to increase a bending rigidity of the floor panel in the lengthwise direction of the automobile body more than a bending rigidity of the panel in the width direction of the automobile body, is provided in the floor panel.

* * * * *

UNITED STATES PATENT AND TRADEMARK OFFICE
CERTIFICATE OF CORRECTION

PATENT NO. : 6,793,276 B2
DATED : September 21, 2004
INVENTOR(S) : Tsuyoshi Sugihara et al.

It is certified that error appears in the above-identified patent and that said Letters Patent is hereby corrected as shown below:

Column 29,
Line 61, "partially in increased" should read -- partially increased --

Column 32,
Line 56, "an" should read -- and --

Signed and Sealed this

Tenth Day of May, 2005

JON W. DUDAS
*Director of the United States Patent and Trademark Office*